United States Patent
Kang et al.

(10) Patent No.: US 8,054,541 B2
(45) Date of Patent: Nov. 8, 2011

(54) FIXED-FOCUS LENS

(75) Inventors: Yi-Hao Kang, Hsinchu (TW);
Yuan-Hung Su, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 38 days.

(21) Appl. No.: 12/643,550

(22) Filed: Dec. 21, 2009

(65) Prior Publication Data

US 2010/0232038 A1    Sep. 16, 2010

Related U.S. Application Data

(60) Provisional application No. 61/202,556, filed on Mar. 12, 2009.

(30) Foreign Application Priority Data

May 27, 2009   (TW) ............................... 98117796 A

(51) Int. Cl.
*G02B 17/00* (2006.01)
*G02B 23/24* (2006.01)

(52) U.S. Cl. ......... 359/364; 359/434; 359/726; 359/727

(58) Field of Classification Search .................. 359/364, 359/434, 726, 727; 353/37, 102, 77
See application file for complete search history.

(56) References Cited

U.S. PATENT DOCUMENTS

| | | | |
|---|---|---|---|
| 4,427,274 A | 1/1984 | Pund et al. | |
| 5,477,394 A | 12/1995 | Shibazaki | |
| 5,495,306 A | 2/1996 | Shibazaki | |
| 5,726,670 A | 3/1998 | Tabata et al. | |
| 6,631,994 B2 | 10/2003 | Suzuki et al. | |
| 6,690,517 B2 | 2/2004 | Ohzawa et al. | |
| 6,984,044 B2 | 1/2006 | Kurioka et al. | |
| 6,989,936 B2 | 1/2006 | Hatakeyama | |
| 6,994,442 B2 | 2/2006 | Kurematsu et al. | |
| 7,009,765 B2 | 3/2006 | Gohman | |
| 7,075,727 B2 | 7/2006 | Jeon et al. | |
| 7,175,287 B2 | 2/2007 | Gohman | |
| 7,370,977 B2 | 5/2008 | Lee | |
| 7,551,363 B2 * | 6/2009 | Kang et al. | 359/726 |
| 2004/0233394 A1 | 11/2004 | Gohman | |
| 2010/0232039 A1 * | 9/2010 | Chen et al. | 359/727 |

* cited by examiner

*Primary Examiner* — Evelyn A. Lester
(74) *Attorney, Agent, or Firm* — J.C. Patents

(57) ABSTRACT

A fixed-focus lens adapted to be disposed between a primary image side and a second image side is provided. The fixed-focus lens includes a second lens group, a first lens group, and a curved reflector arranged in sequence from the primary image side to the second image side. The second lens group includes a first lens, a second lens, and a third lens arranged in sequence from the primary image side to the second image side. The first lens and the third lens have positive refractive powers and each of the first lens, the second lens, and the third lens is a spherical lens.

21 Claims, 9 Drawing Sheets

US 8,054,541 B2

FIXED-FOCUS LENS

CROSS-REFERENCE TO RELATED APPLICATION

This application claims the priority benefit of U.S. provisional application Ser. No. 61/202,556, filed on Mar. 12, 2009. This application also claims the priority benefit of Taiwan application serial no. 98117796, filed on May 27, 2009. The entirety of each of the above-mentioned patent applications is hereby incorporated by reference herein and made a part of this specification.

BACKGROUND OF THE INVENTION

1. Field of the Invention

The invention generally relates to a lens, and more particularly, to a fixed-focus lens.

2. Description of Related Art

A fixed-focus lens is generally used in an optical system. The fixed-focus lens is widely applied therein, such as a monitoring camera, an automotive camera, a rear projection TV, a projector, etc. Along with development of optoelectronic technology, projectors having high quality have become more and more popular in recent years. In order to reduce the distance from the projector to the screen where images are projected and obtain great projected images, a fixed-focus lens having wide field of view is usually adopted therein. However, the images projected thereby may have aberration, such as distortion, field curvature, and astigmatism. Accordingly, in related arts, in order to improve aberration of the projected images, a plurality of aspheric lenses are utilized, or the number of lenses used therein and an overall length thereof are increased.

Moreover, in order to reduce the overall length thereof while improving aberration, a reflector may be added into the fixed-focus lens. For example, in U.S. Pat. No. 7,009,765, sixteen lenses and one reflector are used to reduce the overall length thereof while improving aberration. Furthermore, in US Patent Application Publication No. 2004/0233394, eighteen lenses and two reflectors are used to achieve the above-described objective. Moreover, a plurality of reflectors are used to reduce the distance form the projector to the screen where images are projected in U.S. Pat. No. 5,477,394; 6,994,442; 6,989,936; 6,690,517; or 6,984,044. However, it may enhance difficulty of manufacturing and fabricating the lens to increase the number of lenses used therein and to add the plurality of reflectors thereinto for reducing the overall length thereof while improving aberration, and cost of the projector is increased.

SUMMARY OF THE INVENTION

The invention provides a fixed-focus lens which has low cost and good optical characteristics. The above-described fixed-focus lens is capable of effectively eliminating aberration and reducing volume of a projection system using the same.

Other objects and advantages of the invention may be further understood by referring to the technical features broadly embodied and described as follows.

In order to achieve one or a part of or all of the above advantages or other advantages, an embodiment of the invention provides a fixed lens adapted to be disposed between a primary image side and a second image side. The fixed-focus lens includes a first lens group, a second lens group, and a curved reflector. The first lens group is disposed between the primary image side and the second image side and includes an aspheric lens. The second lens group is disposed in a light path between the primary image side and the first lens group and includes a first lens, a second lens, and a third lens sequentially arranged from the primary image side to the second image side. Moreover, refractive powers of the first lens and the third lens are both positive, and each of the first lens, the second lens, and the third lens is a spherical lens. Accordingly, an image light beam from the primary image side and passing through the first lens group and the second lens group forms one of a butterfly-like spot and a trapezoid-like spot on a reference plane. The reference plane is located between the first lens group and the curved reflector and is perpendicular to a part of the optical axis between the first lens group and the curved reflector. The curved reflector, the image light beam forming the butterfly-like spot is compensated to form a rectangular spot after being reflected by the curved reflector and the image light beam forming the trapezoid-like spot is compensated to form another rectangular spot after being reflected by the curved reflector.

In order to achieve one or a part of or all of the above advantages or other advantages, an embodiment of the invention provides a fixed lens adapted to be disposed between a primary image side and a second image side and has an optical axis. A light valve is adapted to be disposed at the primary image side and emit an image light beam. The fixed-focus lens includes a first lens group, a second lens group, and a curved reflector. The light valve is disposed between the primary image side and the second image side, and is adapted to emit an image light beam. The first lens group is disposed between the primary image side and the second image side and includes an aspheric lens. The second lens group is disposed on a light path between the primary image side and the first lens group and includes a first lens, a second lens, and a third lens sequentially arranged from the primary image side to the second image side. Moreover, refractive powers of the first lens and the third lens are both positive, and each of the first lens, the second lens, and the third lens is a spherical lens. The image light beam passing through the first lens group and the second lens group forms one of a first spot and a second spot on a reference plane, and the reference plane is located between the first lens group and the curved reflector and perpendicular to a part of the optical axis between the first lens group and the curved reflector. The image light beam fondling the first type spot is compensated to form a rectangular spot after being reflected by the curved reflector and the image light beam forming the second type spot is compensated to form another rectangular spot after being reflected by the curved reflector.

The first type spot includes a first butterfly-like reference point (a), a second butterfly-like reference point (b), a third butterfly-like reference point (c), a fourth butterfly-like reference point (d), a fifth butterfly-like reference point (e), a sixth butterfly-like reference point (f), a seventh butterfly-like reference point (g), an eighth butterfly-like reference point (h), a ninth butterfly-like reference point (i), a tenth butterfly-like reference point (j), an eleventh butterfly-like reference point (k), a twelfth butterfly-like reference point (m), and a thirteenth butterfly-like reference point (n). A first image point (A), a second image point (B), a third image point (C), a fourth image point (D), a fifth image point (E), a sixth image point (F), a seventh image point (G), an eighth image point (H), a ninth image point (I), a tenth image point (J), an eleventh image point (K), a twelfth image point (M), and a thirteenth image point (N) on the light valve respectively form the butterfly-like reference points after being imaged by the first lens group and the second lens group. A relationship of the butterfly-like reference points and the image points satisfies at least one of a first condition and a second condition as follows:

the first condition: $\overline{ac} + \overline{gi} > 2 \times \overline{df}$, $\overline{ag} > \overline{bh} > \overline{ci}$, $\overline{BE} = 2\overline{BJ}$, $\overline{CF} = 2\overline{CK}$, $\overline{bc} \approx \overline{jk}$, $\overline{EH} = 2\overline{MH}$, $\overline{FI} = 2\overline{NI}$, and $\overline{mn} \approx \overline{hi}$;

the second condition: $5 > \dfrac{\overline{ac}+\overline{gi}}{2 \times \overline{df}} > 1$, $0.1 \leq \dfrac{\overline{bh}}{\overline{ag}} < 1$, $0.1 \leq \dfrac{\overline{ci}}{\overline{bh}} < 1$, $0.9 \leq \dfrac{\overline{bc}}{\overline{jk}} < 1.1$, $0.9 \leq \dfrac{\overline{hi}}{\overline{mn}} < 1.1$, $\overline{ef} < \overline{jk}$, and $\overline{ef} < \overline{mn}$.

Moreover, the second type spot includes a first trapezoid-like reference point (a'), a second trapezoid-like reference point (b'), a third trapezoid-like reference point (c'), a fourth trapezoid-like reference point (d'), a fifth trapezoid-like reference point (e'), a sixth trapezoid-like reference point (f'), a seventh trapezoid-like reference point (g'), an eighth trapezoid-like reference point (h'), and a ninth trapezoid-like reference point (i'). The first image point (A), the second image point (B), the third image point (C), the fourth image point (D), the fifth image point (E), the sixth image point (F), the seventh image point (G), the eighth image point (H), and the ninth image point (I) on the light valve respectively form the trapezoid-like reference points after being imaged by the first lens group and the second lens group. A relationship between the trapezoid-like reference points and the image points satisfies a third condition as follows:

the third condition: $1.05 > \dfrac{\overline{a'c'}+\overline{g'i'}}{2 \times \overline{d'f'}} > 0.95$, $0.1 \leq \dfrac{\overline{b'h'}}{\overline{a'g'}} < 1$, and $0.1 \leq \dfrac{\overline{c'i'}}{\overline{b'h'}} < 1$.

In order to achieve one or a part of or all of the above advantages or other advantages, an embodiment of the invention provides a fixed lens adapted to be disposed between a primary image side and a second image side. The fixed-focus lens includes a first lens group, a second lens group, and a curved reflector. The first lens group is disposed between the primary image side and the second image side and includes an aspheric lens. The second lens group is disposed in a light path between the primary image side and the first lens group and includes a first lens, a second lens, and a third lens sequentially arranged from the primary image side to the second image side. Moreover, refractive powers of the first lens and the third lens are both positive, and each of the first lens, the second lens, and the third lens is a spherical lens. An effective focal length (EFL) of the fixed-focus lens is F, an EFL of the first lens group is $F_1$, and an EFL of the second lens group is $F_2$, and the fixed-focus lens satisfies at least one of following conditions: $8.5 < |F_1/F| < 50.1$ and $20.2 < |F_2/F| < 75.7$.

In view of the above, the embodiment or the embodiments of the invention may have at least one of the following advantages, by using the curved reflector with the first lens group and the second lens group, the fixed-focus lens in the embodiment of the invention is capable of eliminating aberration, and the fixed-focus lens has relatively wide field of view (FOV) through the configuration thereof. Furthermore, each of the three lenses, i.e. the first lens, the second lens, and the third lens, closest to the primary image side in the fixed-focus lens is a spherical lens, and the refractive powers of the first lens and the third lens are both positive. Accordingly, while less lenses and reflectors are used in the fixed-focus lens, it still has good optical characteristics. Therefore, the projection apparatus adopting the above-described fixed-focus lens is capable of effectively eliminating aberration, enhancing image quality, and reducing volume of the projection system thereof.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected,"

"coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
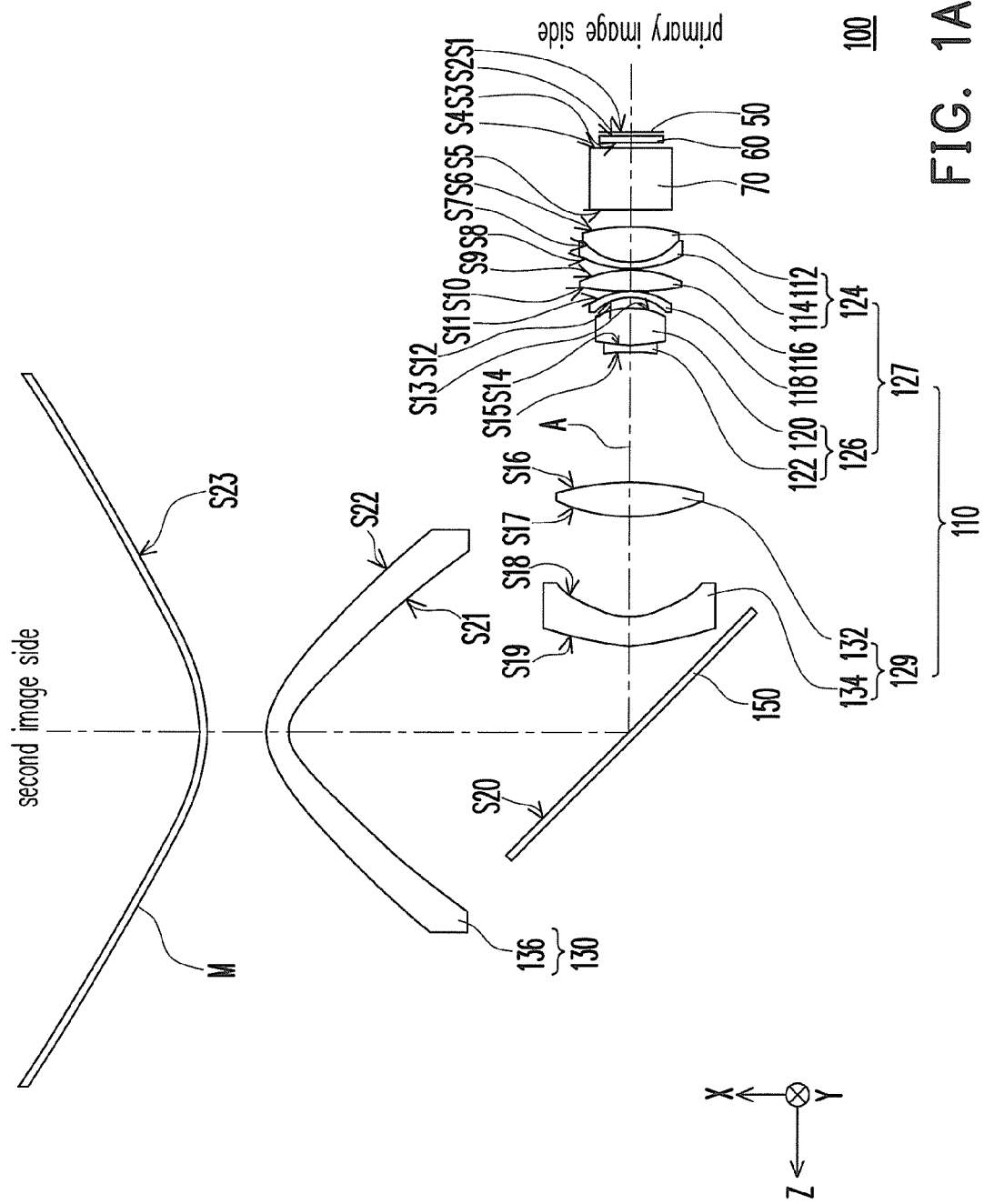
FIG. 1A is a schematic view of a fixed-focus lens according to an embodiment of the invention.

Referring to FIG. 1A, the fixed-focus lens 100 of the embodiment is adapted to be disposed between a primary image side and a second image side. The fixed-focus lens 100 includes a first lens group 130, a second lens group 110, a curved reflector M, and a reflecting element 150. The curved reflector M is disposed in the light path between the primary image side and the second image side, and a refractive power of the curved reflector M is negative.

The second lens group 110 is disposed in the light path between the primary image side and the second image side. In the present embodiment, the second lens group 110 includes a first lens 112, a second lens 114, a third lens 116, a fourth lens 118, a fifth lens 120, a sixth lens 122, a seventh lens 132, and an eighth lens 134 arranged in sequence from the primary image side to the second image side. Refractive powers of the first lens 112, the second lens 114, the third lens 116, the fourth lens 118, the fifth lens 120, the sixth lens 122, the seventh lens 132, and the eighth lens 134 are respectively positive, negative, positive, negative, positive, negative, positive, and negative. Each of the first lens 112, the second lens 114, the third lens 116, the fourth lens 118, the fifth lens 120, the sixth lens 122, and the seventh lens 132 is a spherical lens, and the eighth lens 134 is an aspheric lens. That is, each of the three lenses, i.e. the first lens 112, the second lens 114, and the third lens 116 in the present embodiment, closest to the primary image side in the fixed-focus lens is a spherical lens, and the refractive powers of the first lens 112 and the third lens 116 are both positive.

Moreover, in the present embodiment, each of the first lens 112, the third lens 116, the fifth lens 120, and the seventh lens 132 is a biconvex lens, each of the second lens 114 and the eighth lens 134 is a convex-concave lens with a convex surface facing the second image side, the fourth lens 118 is a convex-concave lens with a convex surface facing the primary image side, and the sixth lens 122 is a biconcave lens, wherein the first lens 112 and the second lens 114 together form a first double cemented lens 124, and the fifth lens 120 and the sixth lens 122 together form a second double cemented lens 126.

The first lens group 130 is disposed in the light path between the second lens group 110 and the second image side. In the present embodiment, the first lens group 130 includes a ninth lens 136, and a refractive power of the ninth lens 136 is negative, wherein the ninth lens 136 is an aspheric lens. That is, the first lens group 130 includes at least one aspheric lens. Moreover, the ninth lens 136 is a convex-concave lens with a convex surface facing the second image side.

In order to ensure optical image quality, the fixed-focus lens 100 in the present embodiment satisfies at least one of two following conditions:
(i) $8.5 < |F_1/F| < 50.1$
(ii) $20.2 < |F_2/F| < 75.7$
wherein an effective focal length (EFL) of the fixed-focus lens 100 is F, an EFL of the first lens group 130 is $F_1$, and an EFL of the second lens group 110 is $F_2$.

In the present embodiment, for the image light beam passing through the first lens group 130 and the second lens group 110, a distance between a near axial ray focus of the image light beam and the first lens group 130 is shorter than a distance between an off-axis ray focus of the image light beam and the first lens group 130.

Moreover, in the present embodiment, the reflecting element 150 is, for example, a plane mirror disposed between the eighth lens 134 and the ninth lens 136 for turning the light path, so that volume of the projection system is reduced.

Furthermore, in the present embodiment, the first lens 112, the second lens 114, the third lens 116, the fourth lens 118, the fifth lens 120, and the sixth lens 122 are configured as a movable lens group 127. The seventh lens 132 and the eighth lens 134 are configured as a fixed lens group 129. The fixed lens group 129 is fixed with respect to the fixed-focus lens 100. When the fixed-focus lens 100 has manufacture error, the manufacture error is effectively compensated by adjusting a relative position of the movable lens group 127 with respect to the fixed lens group 129 in the second lens group 110, so that the image light beam is focused.

Figure 1B:
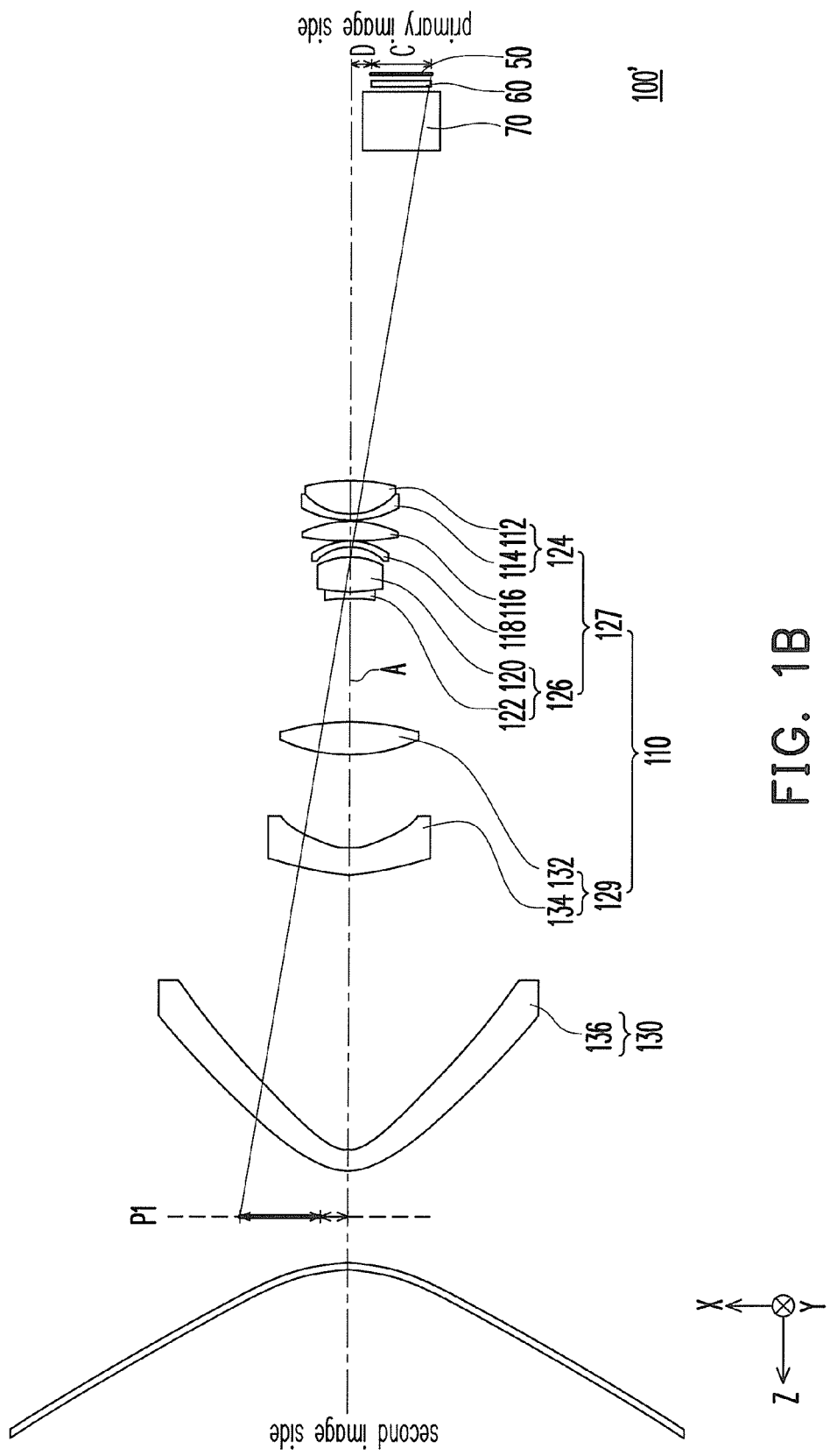
FIG. 1B is a schematic view of a fixed-focus lens according to another embodiment of the invention.

Referring to FIG. 1B, the fixed-focus lens 100' of the present embodiment is similar to the fixed-focus lens 100 shown in FIG. 1A, while the main difference therebetween lies in that the fixed-focus lens 100' of the present embodiment does not include the reflecting element 150, and the light valve 50 deviates from an optical axis A.

In the present embodiment, after passing through the first lens group 130 and the second lens group 110, the image light beam from the light valve 50 forms a butterfly-like spot on a reference plane P1. The reference plane P1 passes through a center position between the first lens group 130 and the curved reflector M and is perpendicular to the optical axis A. The image light beam forming the butterfly-like spot is compensated to form a rectangular spot after being reflected by the curved reflector M. Accordingly, the butterfly-like spot is modified, so that the image without distortion or with less distortion is projected on a screen (not shown). Meanwhile, if a height of the light valve 50 located at the primary image side is defined as C, and an interval between the light valve 50 and the optical axis A is defined as D, an offset of the light valve 50 of the fixed-focus lens 100' with respect to the optical axis A is defined as (C+D)/C. In the present embodiment, the offset of the light valve 50 is greater than and equal to 100%.

Figure 1D:
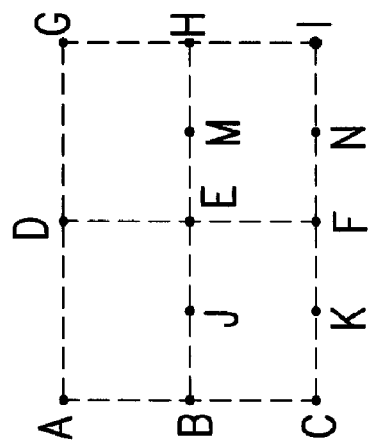
FIG. 1D is a schematic image of the above-described image points on the light valve.
Figure 1C:
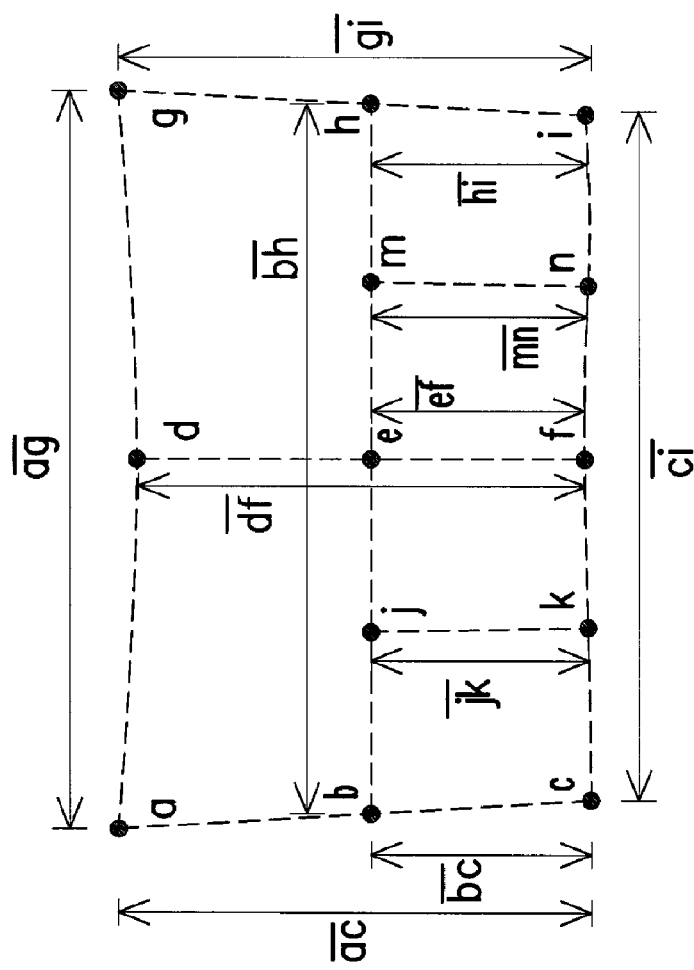
FIG. 1C is a schematic image of the butterfly-like spot according to an embodiment of the invention.

Referring to FIG. 1C, the image light beam passing through the first lens group 130 and the second lens group 110 forms the butterfly-like spot on the reference plane P1 as shown in FIG. 1C. The butterfly-like spot includes a first butterfly-like reference point a, a second butterfly-like reference point b, a third butterfly-like reference point c, a fourth butterfly-like reference point d, a fifth butterfly-like reference point e, a sixth butterfly-like reference point f, a seventh butterfly-like reference point g, an eighth butterfly-like reference point h, a ninth butterfly-like reference point i, a tenth butterfly-like reference point j, an eleventh butterfly-like reference point k, a twelfth butterfly-like reference point m, and a thirteenth butterfly-like reference point n. A first image point A, a second image point B, a third image point C, a fourth image point D, a fifth image point E, a sixth image point F, a seventh image point G, an eighth image point H, a ninth image point I, a tenth image point J, an eleventh image point K, a twelfth image point M, and a thirteenth image point N on the light valve 50 respectively form the above-described butterfly-like reference points after being imaged by the first lens group 130 and the second lens group 110.

In the present embodiment, the above-described butterfly-like reference points and image points satisfy at least one of a first condition and a second condition as follows:

the first condition: $\overline{ac} + \overline{gi} > 2 \times \overline{df}$, $\overline{ag} > \overline{bh} > \overline{ci}$, $\overline{BE} = 2\overline{BJ}$, $\overline{CF} = 2\overline{CK}$, $\overline{bc} \approx \overline{jk}$, $\overline{EH} = 2\overline{MH}$, $\overline{FI} = 2\overline{NI}$, and $\overline{mn} \approx \overline{hi}$;

the second condition: $5 > \dfrac{\overline{ac} + \overline{gi}}{2 \times \overline{df}} > 1$, $0.1 \le \dfrac{\overline{bh}}{\overline{ag}} < 1$, $0.1 \le \dfrac{\overline{ci}}{\overline{bh}} < 1$, $0.9 \le \dfrac{\overline{bc}}{\overline{jk}} \le 1.1$, $0.9 \le \dfrac{\overline{hi}}{\overline{mn}} < 1.1$, $\overline{ef} < \overline{jk}$, and $\overline{ef} < \overline{mn}$.

The definition of each of the above-described line segments is respectively shown as FIG. 1C and FIG. 1D. That is, each of the line segments is defined as a vertical distance between each of the points. For example, the line segment $\overline{ac}$ is the vertical distance between the first butterfly-like reference point a and the third butterfly-like reference point c, and the line segment $\overline{BE}$ is the vertical distance between the second image point B and the fifth image point E. Moreover, $\overline{bc} \approx \overline{jk}$ means that the line segment $\overline{bc}$ is approximately equal to the line segment $\overline{jk}$, and $\overline{mn} \approx \overline{hi}$ means that the line segment $\overline{mn}$ is approximately equal to the line segment $\overline{hi}$. Furthermore, the tenth butterfly-like reference point j, the eleventh butterfly-like reference point k, the twelfth butterfly-like reference point m, and the thirteenth butterfly-like reference point n respectively correspond to the centers J, K, M, and N of the line segments $\overline{BE}$, $\overline{CF}$, $\overline{EH}$, and $\overline{FI}$. However, the tenth butterfly-like reference point j, the eleventh butterfly-like reference point k, the twelfth butterfly-like reference point m, and the thirteenth butterfly-like reference point n are not the centers of the line segments $\overline{be}$, $\overline{cf}$, $\overline{eh}$, and $\overline{fi}$.

As known from the above, in each of the fixed-focus lenses 100 and 100', the configuration of the curved reflector M with the first lens group 130 and the second lens group 110 is capable of effectively eliminating aberration of optical image. Furthermore, in each of the fixed-focus lenses 100 and 100', each of the three lenses, i.e. the first lens 112, the second lens 114, and the third lens 116, closest to the primary image side is a spherical lens, and the refractive powers of the first lens 112 and the third lens 116 are both positive. Accordingly, while less lenses and reflectors are used in each of the fixed-focus lenses 100 and 100', the fixed-focus lenses 100 and 100' still have good optical characteristics. Moreover, when each of the fixed-focus lens 100 and 100' has manufacture error, the manufacture error is effectively compensated by adjusting a relative position of the movable lens group 127 in the second lens group 110, so that the image light beam is focused. Therefore, the fixed-focus lens 100 and 100' each have advantages of a wide FOV about 156.67°, less aberration and distortion while imaging, and so on. Furthermore, each of the fixed-focus lenses 100 and 100' uses less reflectors and lenses, so that not only is the cost of the products reduced, but also the trouble of aligning the optical axis of the optical system is vanished and the difficulty of fabricating the fixed-focus lens is reduced.

An embodiment of the fixed-focus lens 100 is given hereinafter. However, the invention is not limited to the data listed in Table 1 and Table 2. It should be known to those ordinary skilled in the art that various modifications and variations may be made to the structure of the invention without departing from the scope or spirit of the invention.

TABLE 1

| Surface | Curvature radius (mm) | Distance (mm) | Index of refraction | Abbe Number | Notes |
|---|---|---|---|---|---|
| S1 | Infinity | 0.49 | | | Active surface of light valve |
| S2 | Infinity | 3.03 | 1.49 | 70.4 | First glass plate |
| S3 | Infinity | 2 | | | |
| S4 | Infinity | 26 | 1.52 | 64.1 | Second glass plate |
| S5 | Infinity | 7 | | | |
| S6 | 97.47 | 13.88 | 1.52 | 64.1 | First double cemented lens |
| S7 | −25.36 | 2.94 | 1.81 | 39.9 | |
| S8 | −41.46 | 0.2 | | | |
| S9 | 42.31 | 8.64 | 1.5 | 81.5 | Third lens |
| S10 | −121.18 | 0.31 | | | |
| S11 | 25.48 | 2.45 | 1.8 | 42.4 | Fourth lens |
| S12 | 18.2 | 4.39 | | | |
| S13 | 33.5 | 14.99 | 1.5 | 81.5 | Second double cemented lens |
| S14 | −33.78 | 2.79 | 1.76 | 40.1 | |
| S15 | 67.66 | 52.74 | | | |
| S16 | 107.18 | 13.89 | 1.52 | 52.4 | Seventh lens |
| S17 | −69.22 | 41.02 | | | |
| S18 | −25.39 | 12 | 1.53 | 56 | Eighth lens |
| S19 | −34.98 | 34.84 | | | |
| S20 | Infinity | −139 | | | Plane mirror |
| S21 | 9.33 | −9.39 | 1.49 | 57.4 | Ninth lens |
| S22 | 15.69 | −23 | | | |
| S23 | −47 | 264.62 | | | Curved reflector |

In Table 1, the distance refers to a linear distance along the optical axis A between two neighboring surfaces. For example, the distance of surface S9 is the linear distance along the optical axis A between surface S9 and surface S10. As for the corresponding thickness, refractive index, and Abbe Number of each lens in the Remarks column, refer to the numeral value of each distance, refractive index, and Abbe Number in the same row. Moreover, in Table 1, surface S1 is an active surface of the light valve 50, surfaces S4 and S5 are respectively two surfaces of the second glass plate 70, and surfaces S2 and S3 are respectively two surfaces of the first glass plate 60 for protecting the light valve 50, wherein the distance listed in the row of surface S1 is the distance from surface S2 to the active surface of the light valve 50. Surfaces S6 and S8 are two surfaces of the first double cemented lens 124, surfaces S9 and S10 are two surfaces of the third lens 116, surfaces S11 and S12 are two surfaces of the fourth lens 118, surfaces S13 and S15 are two surfaces of the second double cemented lens 126, surfaces S16 and S17 are two surfaces of the seventh lens 132, surfaces S18 and S19 are two surfaces of the eighth lens 134, surfaces S20 is a reflecting surface of the plane mirror 150, surfaces S21 and S22 are two surfaces of the ninth lens 136, and surfaces S23 is a reflecting surface of the curved reflector M.

As know from Table 1, each of the third lens 116 and the fifth lens 120 is a lens having low dispersion, wherein the Abbe Number of the third lens 116 and the fifth lens 120 are both greater than 75, and refractive indexes of the third lens 116 and the fifth lens 120 are both less than 1.55. That is, the second lens group 110 includes at least one low dispersion lens.

In the present embodiment, surfaces S21-S23 turn 90 degrees in a counterclockwise manner according to BDE mode, and the BED mode means that the turning angle thereof lies in X-Z plane and turns with respect to Y direction as an axis. That is, due to the plane mirror 150, the light beam is turned about 90 degrees with respect to original traveling direction after being reflected by surface S20, so that an overall length of the fixed-focus lens in the projection system is reduced.

The numeral values of the parameters such as the radius of curvature and the distance of each surface are given in Table 1, and may not be repeated herein again.

The above surfaces S18, S19, and S21-S23 are aspheric surfaces with even power, and are expressed by the following formula:

$$Z = \frac{cr^3}{1+\sqrt{1-(1+k)c^2r^2}} + A_2r^2 + A_4r^4 + A_6r^6 + A_8r^8 + A_{10}r^{10} + A_{12}r^{12}$$

In the formula, Z is a sag in the direction of the optical axis A, and c is the inverse of the radius of an osculating sphere, i.e. the inverse of the radius of curvature (e.g., the radius of curvatures of surfaces S18, S19, and S21-S23 in the Table 1) close to the optical axis A. k is a conic coefficient, r is an aspheric height, i.e. the height from the center to the edge of the lens, and $A_2, A_4, A_6, A_8, A_{10}, A_{12}$ . . . are aspheric coefficients, wherein the coefficient $A_2$ is 0 in this embodiment. The parameter values of surfaces S18, S19, and S21-S23 are listed in Table 2.

fifth lens 320, the sixth lens 322, the seventh lens 324, the eighth lens 332, the ninth lens 334, and the tenth lens 336 are respectively positive, positive, positive, negative, positive, positive, negative, positive, positive, and negative. Each of the first lens 312, the second lens 314, the third lens 316, the fourth lens 318, the fifth lens 320, the sixth lens 322, the seventh lens 324, the eighth lens 332, the ninth lens 334, and the tenth lens 336 is a spherical lens.

Moreover, in the present embodiment, each of the first lens 312 and the ninth lens 334 is a concave-convex lens with a convex surface facing the second image side, each of the second lens 314, the sixth lens 322, and the eighth lens 332 is a biconvex lens, each of the third lens 316 and the fifth lens 320 is a concave-convex lens with a convex surface facing the primary image side, the fourth lens 318 is a convex-concave lens with a convex surface facing the primary image side, the seventh lens 324 is a biconcave lens, and the tenth lens 336 is a convex-concave lens with a convex surface facing the second image side.

The first lens group 330 is disposed in the light path between the second lens group 310 and the second image side. In the present embodiment, the first lens group 330 includes a eleventh lens 338 and a twelfth lens 340 arranged in sequence from the primary image side to the second image side, refractive powers of the eleventh lens 338 and the twelfth lens 340 are respectively positive and negative. Each of the eleventh lens 338 and the twelfth lens 340 is an aspheric lens. That is, the first lens group 330 includes at least one aspheric lens. Furthermore, the eleventh lens 338 is a concave-convex lens with a convex surface facing the second

TABLE 2

| Aspheric Parameter | Conic Coefficient k | Coefficient $A_4$ | Coefficient $A_6$ | Coefficient $A_8$ | Coefficient $A_{10}$ | Coefficient $A_{12}$ |
|---|---|---|---|---|---|---|
| S18 | −4.1223531 | −1.38524E−06 | 1.45749E−09 | −1.04726E−11 | 8.44955E−15 | −2.27342E−18 |
| S19 | −3.5314551 | 1.03256E−05 | −9.24444E−09 | 2.37611E−12 | 6.59856E−16 | −3.27608E−19 |
| S21 | −2.2510626 | 3.70037E−06 | −2.49574E−09 | 8.19669E−13 | −1.24573E−16 | 7.0159E−21 |
| S22 | −3.8556978 | 3.96555E−06 | −1.92024E−09 | 4.6565E−13 | −5.39191E−17 | 2.35905E−21 |
| S23 | −2.9539095 | 8.40785E−08 | −7.84645E−12 | 4.33209E−16 | −1.28847E−20 | 1.58454E−25 |

Figure 2A:
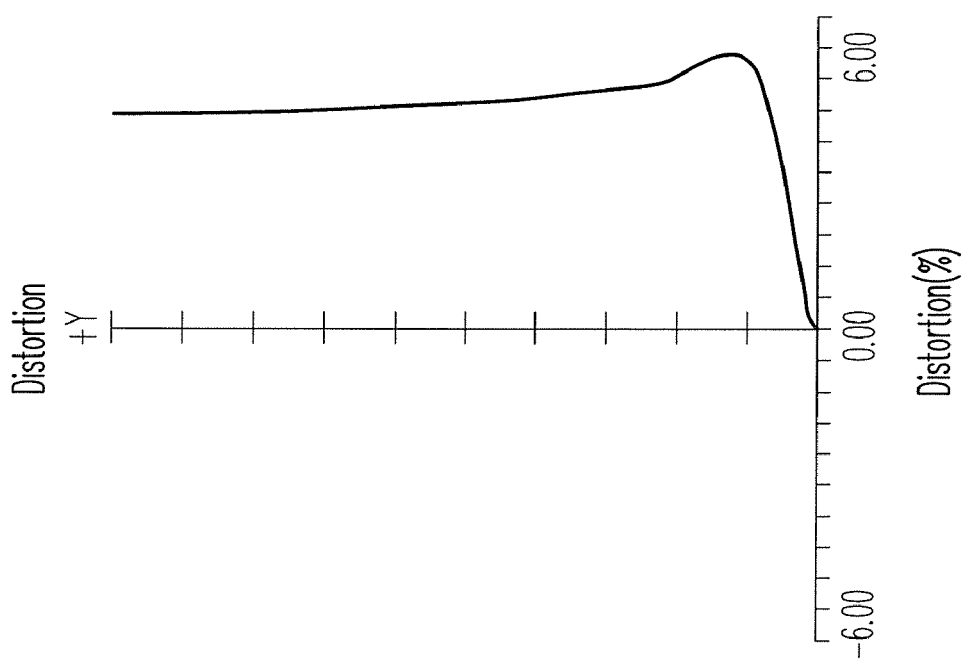
FIG. 2A and FIG. 2B are diagrams showing the optical simulation data of imaging of the fixed-focus lens in FIG. 1.
Figure 2B:
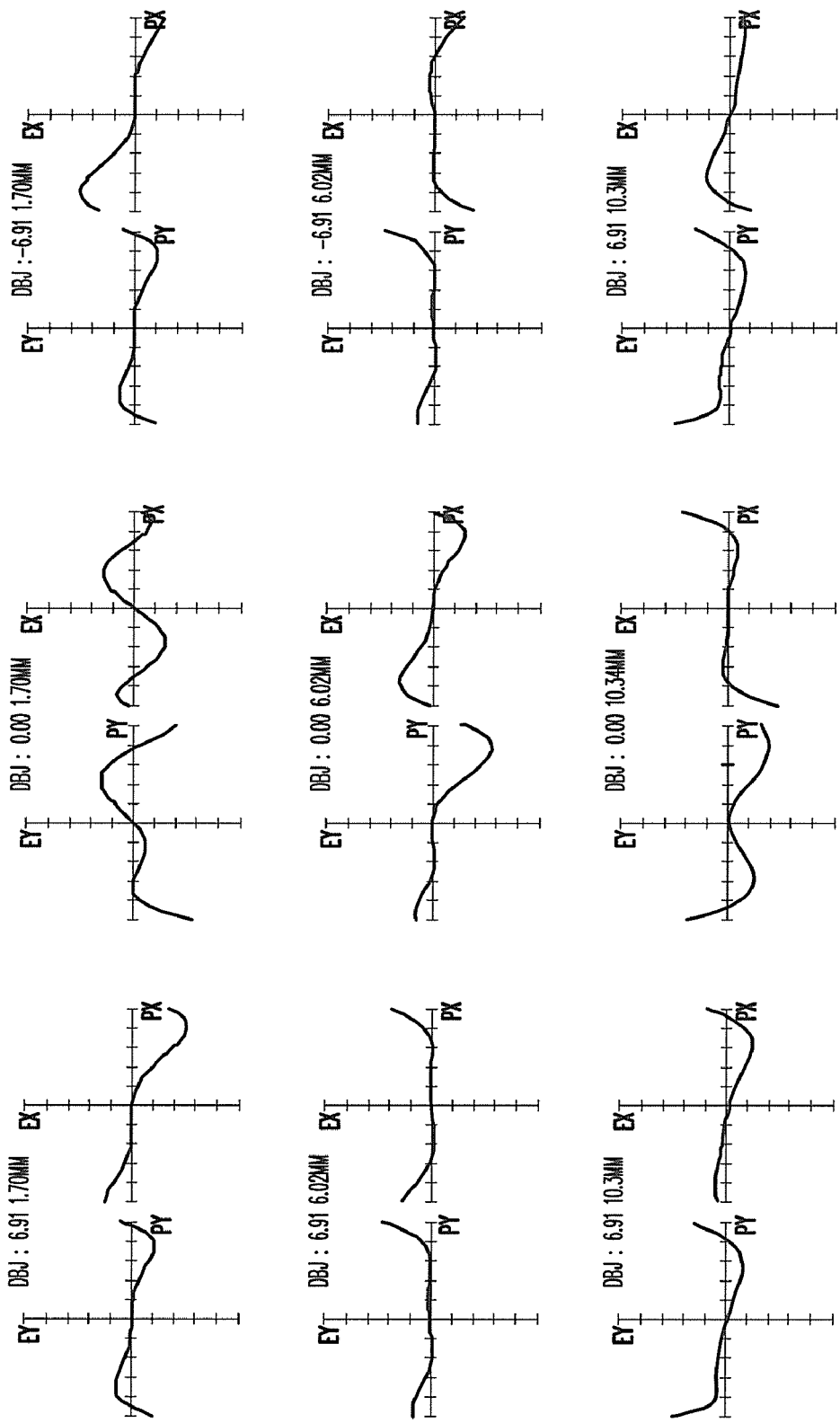

Referring to FIG. 2A and FIG. 2B, FIG. 2A shows graphic of a distortion and is simulated with a light having wavelength 550 nm. FIG. 2B is a transverse ray fan plot of an image and is simulated with a light having wavelength 550 nm. Since both the graphics shown in FIG. 2A and FIG. 2B fall within a standard range, the fixed-focus lens 100 of the present embodiment may maintain a good imaging quality while having a wide FOV.

Figure 3A:
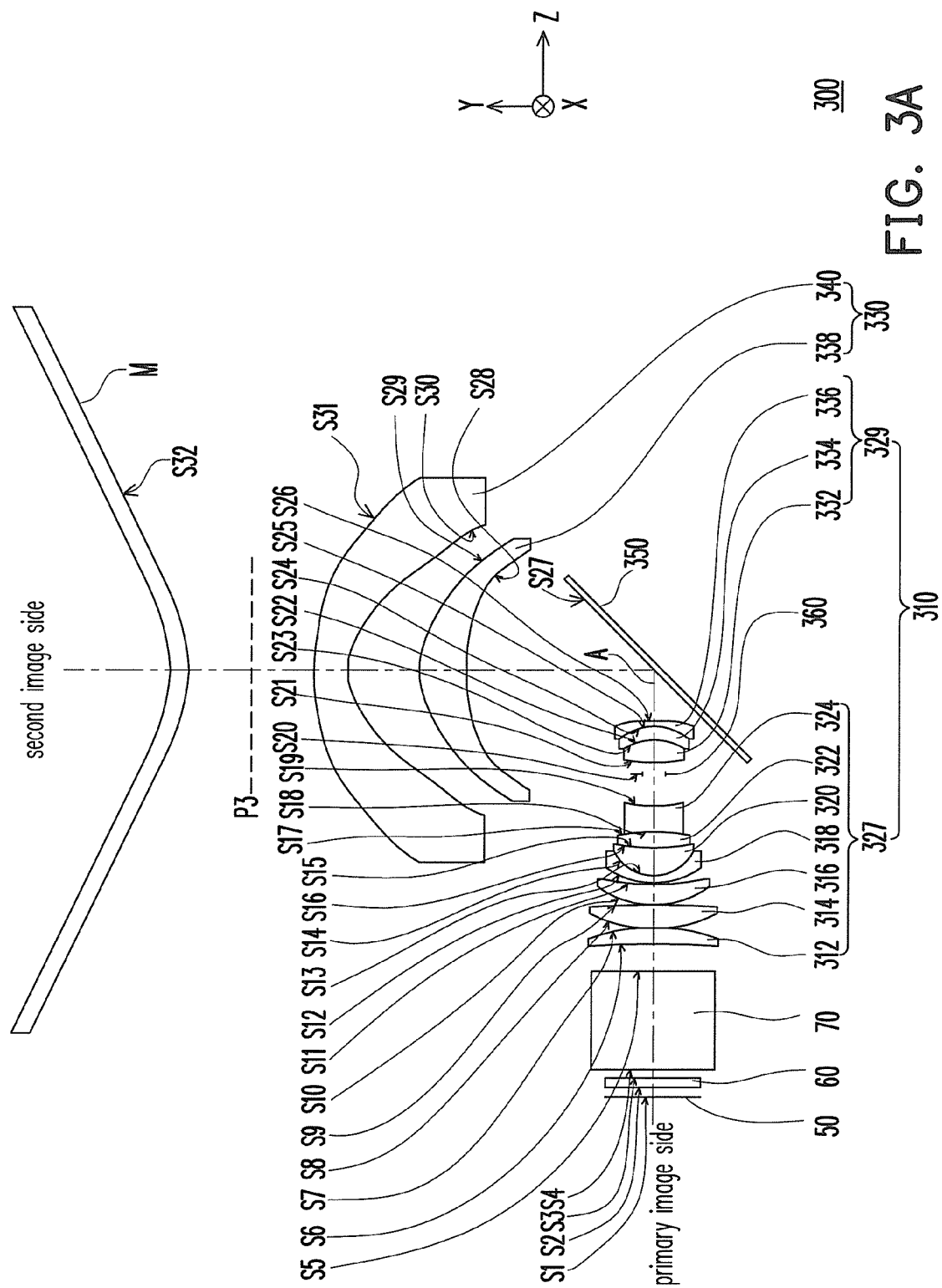
FIG. 3A is a schematic view of a fixed-focus lens according to another embodiment of the invention.

Referring to FIG. 3A, the fixed-focus lens 300 of the present embodiment is adapted to be disposed between a primary image side and a second image side. The fixed-focus lens 300 includes a first lens group 330, a second lens group 310, a curved reflector M, and a reflecting element 350. The curved reflector M is disposed in the light path between the primary image side and the second image side, wherein a refractive power of the curved reflector M is negative.

The second lens group 310 is disposed in the light path between the primary image side and the second image side. In the present embodiment, the second lens group 310 includes a first lens 312, a second lens 314, a third lens 316, a fourth lens 318, a fifth lens 320, a sixth lens 322, a seventh lens 324, an eighth lens 332, a ninth lens 334, and a tenth lens 336 arranged in sequence from the primary image side to the second image side, refractive powers of the first lens 312, the second lens 314, the third lens 316, the fourth lens 318, the image side, and the twelfth lens 340 is a convex-concave lens with a convex surface facing the second image side.

In order to ensure optical image quality, the fixed-focus lens 300 in the present embodiment satisfies at least one of two following conditions:

(i) 8.5<|F$_1$/F|<50.1

(ii) 20.2<|F2/F|<75.7 wherein an effective focal length (EFL) of the fixed-focus lens 300 is F, an EFL of the first lens group 330 is $F_1$, and an EFL of the second lens group 310 is $F_2$.

In the present embodiment, for the image light beam passing through the first lens group 330 and the second lens group 310, a distance between a near axial ray focus of the image light beam and the first lens group 330 is shorter than a distance between an off-axis ray focus of the image light beam and the first lens group 330.

Moreover, in the present embodiment, the reflecting element 350, for example, is a plane mirror disposed between the tenth lens 336 and the eleventh lens 338 for turning the light path, so that volume of the projection system is reduced. The fixed-focus lens 300 further includes an aperture stop 360 disposed in the light path within the second lens group 310.

Furthermore, in the present embodiment, the first lens 312, the second lens 314, the third lens 316, the fourth lens 318, the fifth lens 320, the sixth lens 322, and the seventh lens 324 are configured as a movable lens group 327. The eighth lens 332, the ninth lens 334, and the tenth lens 336 are configured as a fixed lens group 329. The fixed lens group 329 is fixed with respect to the fixed-focus lens 300. When the fixed-focus lens 300 has manufacture error, the manufacture error is effectively compensated by adjusting a relative position of the movable lens group 327 with respect to the fixed lens group 329 in the second lens group 310, so that the image light beam is focused.

Similarly, in the present embodiment, the offset of the light valve 50 with respect to the optical axis A is greater than or equal to 100%. Different from the fixed-focus lens 100 and 100', in the present embodiment, after passing through the first lens group 330 and the second lens group 310, the image light beam from the light valve 50 forms a trapezoid-like spot on a reference plane P3. The reference plane P3 passes through a center position between the first lens group 330 and the curved reflector M and is perpendicular to the optical axis A. The image light beam forming the trapezoid-like spot is compensated to form another rectangular spot after being reflected by the curved reflector M. Accordingly, the trapezoid-like spot is modified, so that the image without distortion or with less distortion is projected on a screen (not shown).

Figure 3B:
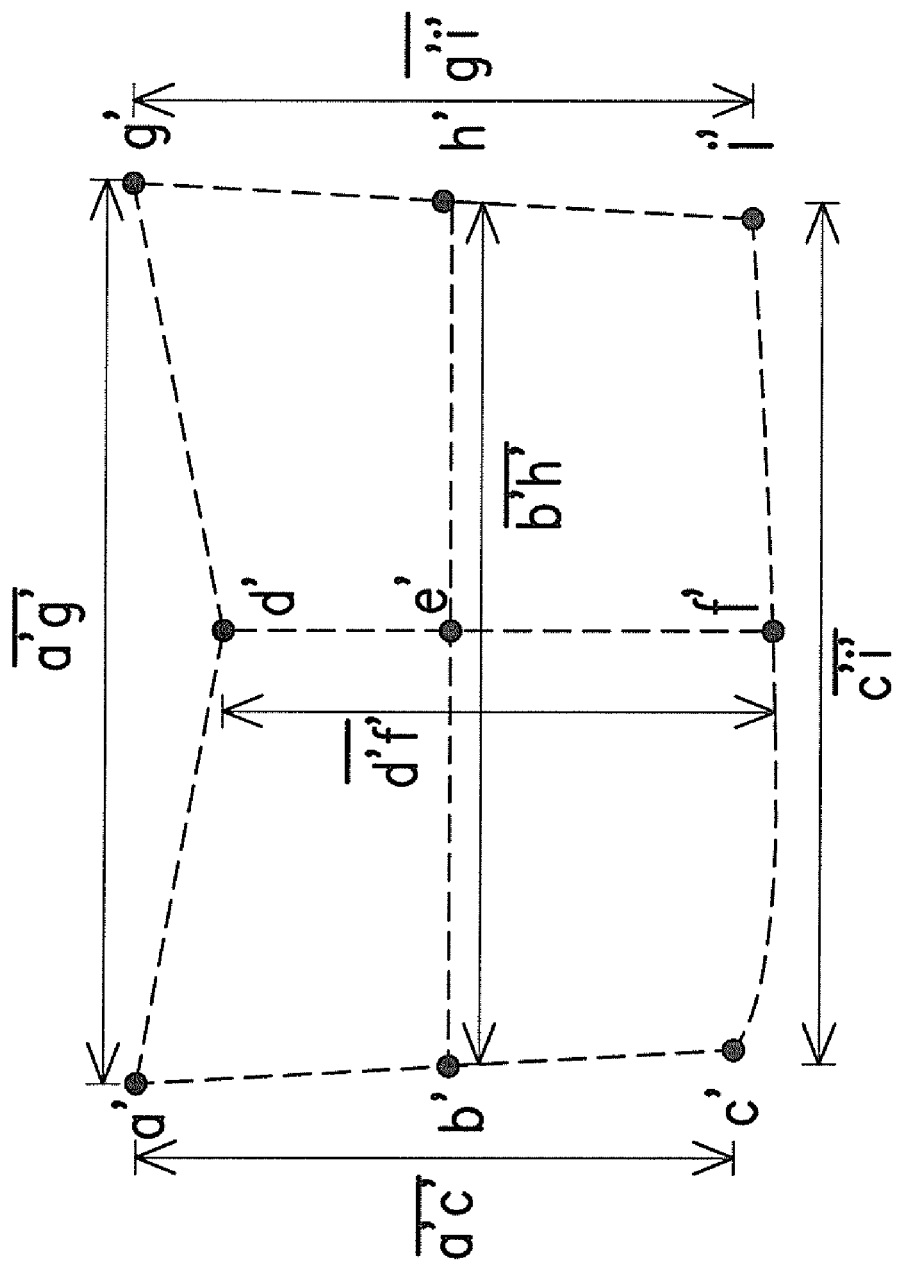
FIG. 3B is a schematic image of the trapezoid-like spot according to an embodiment of the invention.

Referring to FIG. 3B, the trapezoid-like spot includes a first trapezoid-like reference point a', a second trapezoid-like reference point b', a third trapezoid-like reference point c', a fourth trapezoid-like reference point d', a fifth trapezoid-like reference point e', a sixth trapezoid-like reference point f', a seventh trapezoid-like reference point g', an eighth trapezoid-like reference point h', and a ninth trapezoid-like reference point i'. The first image point A, the second image point B, the third image point C, the fourth image point D, the fifth image point E, the sixth image point F, the seventh image point G, the eighth image point H, and the ninth image point I on the light valve 50 respectively form the above-described trapezoid-like reference points after being imaged by the first lens group 330 and the second lens group 310.

In the present embodiment, the above-described trapezoid-like reference points and image points satisfy a third condition as follows:

$$\text{the third condition: } 1.05 > \frac{\overline{a'c'} + \overline{g'i'}}{2 \times \overline{d'f'}} > 0.95, \ 0.1 \leq \frac{\overline{b'h'}}{\overline{a'g'}} < 1,$$

$$\text{and } 0.1 \leq \frac{\overline{c'i'}}{\overline{b'h'}} < 1.$$

The definition of each of the above-described line segments is shown as FIG. 3B. That is, each of the line segments is defined as a vertical distance between each of the points. For example, the line segment $\overline{a'c'}$ is the vertical distance between the first trapezoid-like reference point a' and the third trapezoid-like reference point c'.

As known from above, in the fixed-focus lens 300, the configuration of the curved reflector M with the first lens group 330 and the second lens group 310 is capable of effectively eliminating aberration of optical image. Furthermore, each of the three lenses closest to the primary image side in the fixed-focus lens is a spherical lens, and the refractive powers of the first lens 312 and the third lens 316 are both positive. Accordingly, while less lenses and reflectors are used in the fixed-focus lens 300, the fixed-focus lens 300 still has good optical characteristics. Similarly, when the fixed-focus lens 300 has manufacture error, the manufacture error is effectively compensated by adjusting a relative position of the movable lens group 327, so that the image light beam is focused.

An embodiment of the fixed-focus lens 300 is given hereinafter. However, the invention is not limited to the data listed in Table 3 and Table 4. It should be known to those ordinary skilled in the art that various modifications and variations can be made to the structure of the present invention without departing from the scope or spirit of the invention.

TABLE 3

| Surface | Curvature radius (mm) | Distance (mm) | Index of refraction | Abbe Number | Notes |
|---------|----------------------|---------------|---------------------|-------------|-------|
| S1 | infinity | 0.483 | | | Active surface of light valve |
| S2 | infinity | 3 | 1.49 | 70.44 | First glass plate |
| S3 | infinity | 2 | | | |
| S4 | infinity | 26 | 1.52 | 64.17 | Second glass plate |
| S5 | infinity | 7 | | | |
| S6 | −388.05 | 4.13 | 1.84 | 33.35 | First lens |
| S7 | −57.67 | 0.2 | | | |
| S8 | 43.68 | 5.76 | 1.5 | 79.96 | Second lens |
| S9 | −330.29 | 0.2 | | | |
| S10 | 27.53 | 5.14 | 1.5 | 80.49 | Third lens |
| S11 | 80.66 | 0.49 | | | |
| S12 | 24.48 | 1.54 | 1.84 | 32.19 | Fourth lens |
| S13 | 12.13 | 0.2 | | | |
| S14 | 12.25 | 7.16 | 1.5 | 81.55 | Fifth lens |
| S15 | 42.91 | 0.2 | | | |
| S16 | 22.18 | 4.76 | 1.5 | 81.49 | Sixth lens |
| S17 | −41.92 | 0.2 | | | |
| S18 | −46.31 | 5.8 | 1.83 | 37.18 | Seventh lens |
| S19 | 21.33 | 2.3 | | | |
| S20 | infinity | 3.41 | | | Aperture Stop |
| S21 | 110.98 | 5.36 | 1.64 | 35.59 | Eighth lens |
| S22 | −15.7 | 0.2 | | | |
| S23 | −17.64 | 3.55 | 1.74 | 27.83 | Ninth lens |
| S24 | −14.84 | 0.2 | | | |
| S25 | −14.53 | 1.2 | 1.74 | 49.71 | Tenth lens |
| S26 | −46.14 | 13 | | | |
| S27 | infinity | −49.99 | | | Plane mirror |
| S28 | 37.09 | −12.08 | 1.49 | 57.44 | Eleventh lens |
| S29 | 16.67 | −19.05 | | | |
| S30 | 12.23 | −8.03 | 1.49 | 57.44 | Twelfth lens |
| S31 | 124.91 | −46.04 | | | |
| S32 | −32 | 272.35 | | | Curved reflector |

In Table 3, the distance refers to a linear distance along the optical axis A between two neighboring surfaces. For example, the distance of surface S6 is the linear distance along the optical axis A between surfaces S6 and S7. As for the corresponding thickness, refractive index, and Abbe number of each lens in the Remarks column, refer to the numeral value of each distance, refractive index, and Abbe number in the same row. Moreover, in Table 3, surface S1 is an active surface of the light valve 50, surfaces S4 and S5 are respectively two surfaces of the second glass plane 70, and surfaces S2 and S3 are respectively two surfaces of the first glass plane 60 for protecting the light valve 50, wherein the distance listed in the row of surface S1 is the distance from surface S2 to the active surface of the light valve 50. Surfaces S6 and S7 are two surfaces of the first lens 312, surfaces S8 and S9 are two surfaces of the second lens 314, surfaces S10 and S11 are two surfaces of the third lens 316, surfaces S12 and S13 are two surfaces of the fourth lens 318, surfaces S14 and S15 are two surfaces of the fifth lens 320, surfaces S16 and S17 are two surfaces of the sixth lens 322, surfaces S18 and S19 are two surfaces of the seventh lens 324, surfaces S20 is the aperture stop 360, surfaces S21 and S22 are two surfaces of the eighth lens 332, surfaces S23 and S24 are two surfaces of the ninth lens 334, surfaces S25 and S26 are two surfaces of the tenth lens 336, surfaces S27 is a reflecting surface of the plane mirror 350, surfaces S28 and S29 are two surfaces of the eleventh lens 338, surfaces S30 and S31 are two surfaces of the twelfth lens 340, and surfaces S32 is a reflecting surface of the curved reflector M.

As know from Table 3, each of the second lens 314, the third lens 316, the fifth lens 320, and the sixth lens 322 is a lens having low dispersion, wherein Abbe Number of the second lens 314, the third lens 316, the fifth lens 320, and the sixth lens 322 are all greater than 75, and refractive indexes of the second lens 314, the third lens 316, the fifth lens 320, and the sixth lens 322 are all less than 1.55. That is, the second lens group 310 includes at least one low dispersion lens.

Different from the fixed focus lens 100, in the present embodiment, surfaces S28-S32 of the fixed-focus lens 300 turn 90 degrees in a clockwise manner according to ADE mode, and the AED mode means that the turning angle thereof lies in Y-Z plane and turns with respect to X direction as an axis. That is, due to the plane mirror 350, the light beam is turned about 90 degrees with respect to original traveling direction after being reflected by surface S27, so that an overall length of the fixed-focus lens in the projection system is reduced.

The numeral values of the parameters such as the radius of curvature and the distance of each surface are given in Table 3, and may not be repeated herein again.

The above surfaces S28-S32 are aspheric surfaces with even power, and are expressed by the following formula:

$$Z = \frac{cr^2}{1+\sqrt{1-(1+k)c^2r^2}} + A_2r^2 + A_4r^4 + A_6r^6 + A_8r^8 + A_{10}r^{10} + A_{12}r^{12}$$

In the formula, Z is a sag in the direction of the optical axis A, and c is the inverse of the radius of an osculating sphere, i.e. the inverse of the radius of curvature (e.g., the radius of curvatures of surfaces S28-S32 in the Table 3) close to the optical axis A. k is a conic coefficient, r is an aspheric height, i.e. the height from the center to the edge of the lens, and $A_2$, $A_4$, $A_6$, $A_8$, $A_{10}$, $A_{12}$ ... are aspheric coefficients, wherein the coefficient $A_2$ is 0 in this embodiment. The parameter values of Surfaces S28-S32 are listed in Table 4.

from the primary image side to the second image side, refractive powers of the first lens 412, the second lens 414, the third lens 416, the fourth lens 418, the fifth lens 420, the sixth lens 422, the seventh lens 432, the eighth lens 434, and the ninth lens 436 are respectively positive, positive, positive, negative, positive, negative, positive, positive, and negative. Each of the first lens 412, the second lens 414, the third lens 416, the fourth lens 418, the fifth lens 420, the sixth lens 422, the seventh lens 432, the eighth lens 434, and the ninth lens 436 is a spherical lens.

Moreover, each of the first lens 412, the seventh lens 432, and the eighth lens 434 is a concave-convex lens with a convex surface facing the second image side, each of the second lens 414 and the fifth lens 420 is a biconvex lens, the third lens 416 is a concave-convex lens with a convex surface facing the primary image side, the fourth lens 418 is a convex-concave lens with a convex surface facing the primary image side, the sixth lens 422 is a biconcave lens, and the ninth lens 436 is a convex-concave lens with a convex surface facing the second image side.

The first lens group 430 is disposed in the light path between the second lens group 410 and the second image side. In the present embodiment, the first lens group 430 includes a tenth lens 438 and a eleventh lens 440 arranged in sequence from the primary image side to the second image side, refractive powers of the tenth lens 438 and the eleventh lens 440 are respectively positive and negative. Each of the tenth lens 438 and the eleventh lens 440 is an aspheric lens. That is, the first lens group 430 includes at least one aspheric lens. Furthermore, the tenth lens 438 is a concave-convex lens with a convex surface facing the second image side, and the eleventh lens 440 is a convex-concave lens with a convex surface facing the second image side.

In order to ensure optical image quality, the fixed-focus lens 400 in the present embodiment satisfies at least one of two following conditions:

(i) $8.5 < |F_1/F| < 50.1$ (ii) $20.2 < |F_2/F| < 75.7$ wherein an effective focal length (EFL) of the fixed-focus lens 400 is F, an EFL of the first lens group 430 is $F_1$, and an EFL of the second lens group 410 is $F_2$.

In the present embodiment, for the image light beam passing through the first lens group 430 and the second lens group 410, a distance between a near axial ray focus of the image

TABLE 4

| Aspheric Parameter | Conic Coefficient k | Coefficient $A_4$ | Coefficient $A_6$ | Coefficient $A_8$ | Coefficient $A_{10}$ | Coefficient $A_{12}$ |
|---|---|---|---|---|---|---|
| S28 | −5.0495315 | −9.72782E−06 | 4.5261E−08 | −7.62435E−11 | 9.59625E−14 | −4.65763E−17 |
| S29 | −1.6898316 | −2.28503E−05 | 4.77099E−08 | −5.4136E−11 | 4.83534E−14 | −1.88589E−17 |
| S30 | −3.3123458 | 1.63166E−05 | −9.30918E−09 | 4.49949E−12 | −1.87618E−15 | 2.38943E−19 |
| S31 | 4.34788321 | 6.80025E−06 | −3.29238E−09 | 7.85753E−13 | −6.61278E−17 | −1.3353E−20 |
| S32 | −4.142967 | 3.47976E−08 | −8.21497E−13 | −2.89678E−17 | 2.15846E−21 | −3.62194E−26 |

Figure 4:
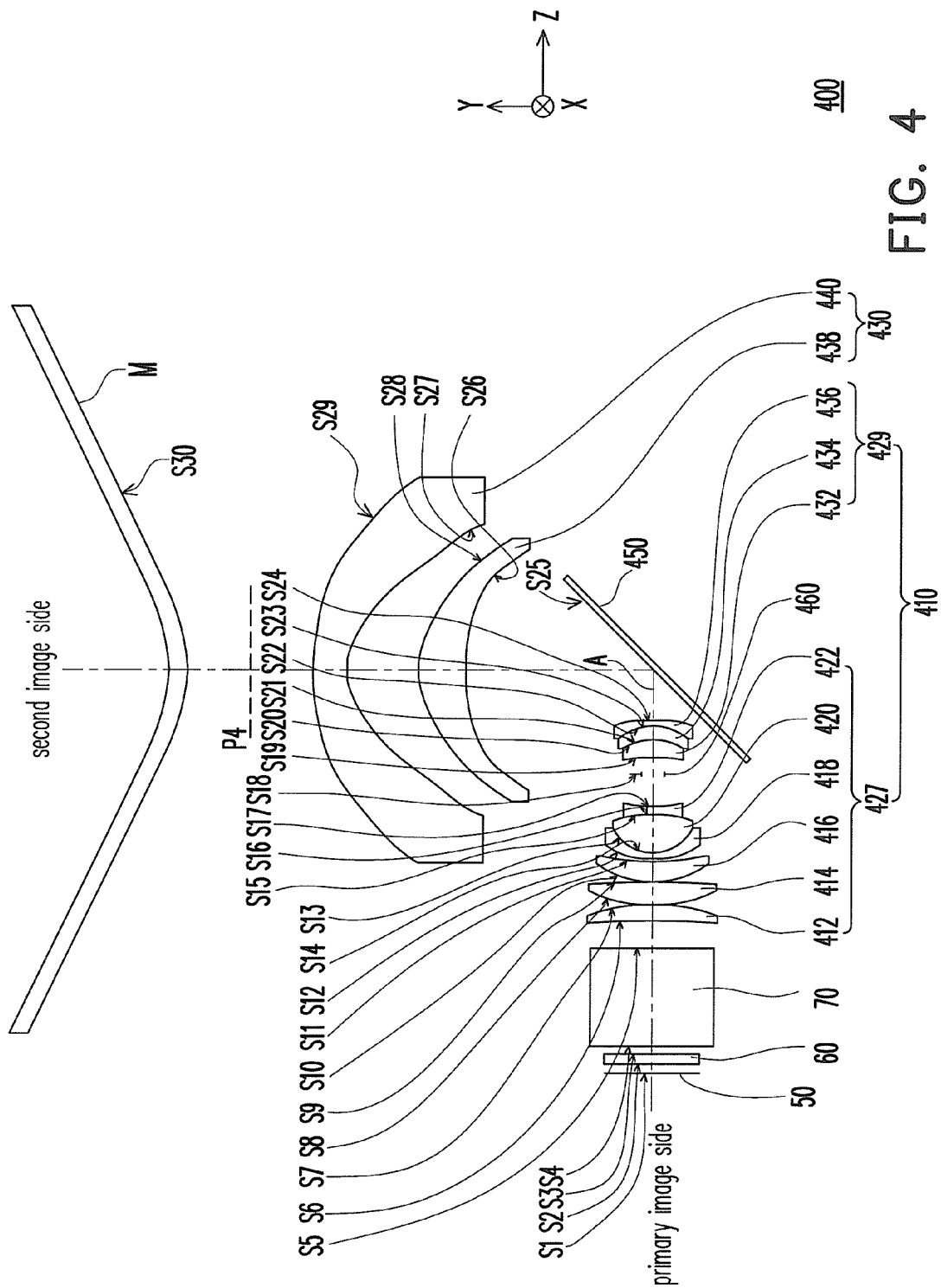
FIG. 4 is a schematic view of a fixed-focus lens according to another embodiment of the invention.

Referring to FIG. 4, the fixed-focus lens 400 of the present embodiment is adapted to be disposed between a primary image side and a second image side. The fixed-focus lens 400 includes a first lens group 430, a second lens group 410, a curved reflector M, and a reflecting element 450. The curved reflector M is disposed in the light path between the primary image side and the second image side, wherein a refractive power of the curved reflector M is negative.

The second lens group 410 is disposed in the light path between the primary image side and the second image side. In the present embodiment, the second lens group 410 includes a first lens 412, a second lens 414, a third lens 416, a fourth lens 418, a fifth lens 420, a sixth lens 422, a seventh lens 432, an eighth lens 434, and a ninth lens 436 arranged in sequence light beam and the first lens group 430 is shorter than a distance between an off-axis ray focus of the image light beam and the first lens group 430.

Moreover, in the present embodiment, the reflecting element 450, for example, is a plane mirror disposed between the ninth lens 436 and the tenth lens 438 for turning the light path, so that volume of the projection system is reduced. The fixed-focus lens 400 further includes an aperture stop 460, and the aperture stop 460 is disposed in the light path of the second lens group 410.

Furthermore, in the present embodiment, the first lens 412, the second lens 414, the third lens 416, the fourth lens 418, the fifth lens 420, and the sixth lens 422 are configured as a movable lens group 427. The seventh lens 432, the eighth lens 434, and the ninth lens 436 are configured as a fixed lens group 429. The fixed lens group 429 is fixed with respect to the fixed-focus lens 400. When the fixed-focus lens 400 has manufacture error, the manufacture error is effectively compensated by adjusting a relative position of the movable lens group 427 with respect to the fixed lens group 429 in the second lens group 410, so that the image light beam is focused.

Similarly, in the present embodiment, the offset of the light valve 50 with respect to the optical axis A is greater than or equal to 100%. Accordingly, after passing through the first lens group 430 and the second lens group 410, the image light beam from the light valve 50 forms the trapezoid-like spot on a reference plane P4. The reference plane P4 passes through a center position between the first lens group 430 and the curved reflector M and is perpendicular to the optical axis A. The image light beam Ruining the trapezoid-like spot is compensated to form another rectangular spot after being reflected by the curved reflector M. Accordingly, the trapezoid-like spot is modified, so that the image without distortion or with less distortion is projected on a screen (not shown). As a result, in the fixed-focus lens 400, the configuration of the curved reflector M with the first lens group 430 and the second lens group 410 is capable of effectively eliminating aberration of optical image. Furthermore, each of the three lenses closest to the primary image side in the fixed-focus lens is a spherical lens, and the refractive powers of the first lens 412 and the third lens 416 are both positive. Accordingly, while less lenses and reflectors are used in the fixed-focus lens 400, the fixed-focus lens 100 still has good optical characteristics. Similarly, when the fixed-focus lens 400 has manufacture error, the manufacture error is effectively compensated by adjusting a relative position of the movable lens group 427, so that the image light beam is focused.

An embodiment of the fixed-focus lens 400 is given hereinafter. However, the invention is not limited to the data listed in Table 5 and Table 6. It should be known to those ordinary skilled in the art that various modifications and variations may be made to the structure of the invention without departing from the scope or spirit of the invention.

TABLE 5

| Surface | Curvature radius (mm) | Distance (mm) | Index of refraction | Abbe Number | Notes |
|---|---|---|---|---|---|
| S1 | infinity | 0.48 | | | Active surface of light valve |
| S2 | infinity | 3 | 1.49 | 70.44 | First glass plate |
| S3 | infinity | 2 | | | |
| S4 | infinity | 26 | 1.52 | 64.17 | Second glass plate |
| S5 | infinity | 5.1 | | | |
| S6 | −386.15 | 4.1 | 1.85 | 23.9 | First lens |
| S7 | −56.74 | 0.2 | | | |
| S8 | 40.68 | 5.97 | 1.5 | 81.5 | Second lens |
| S9 | −281.25 | 0.2 | | | |
| S10 | 24.57 | 5.53 | 1.5 | 81.5 | Third lens |
| S11 | 79.01 | 0.2 | | | |
| S12 | 25.44 | 1.22 | 1.84 | 32.6 | Fourth lens |
| S13 | 11.63 | 0.2 | | | |
| S14 | 11.75 | 9.25 | 1.5 | 81.5 | Fifth lens |
| S15 | −34.48 | 0.2 | | | |
| S16 | −33.87 | 1.85 | 1.84 | 25.2 | Sixth lens |
| S17 | 68.14 | 7.75 | | | |
| S18 | infinity | 4.13 | | | Aperture Stop |
| S19 | −413.38 | 3.18 | 1.65 | 34.1 | Seventh lens |
| S20 | −26.66 | 0.2 | | | |
| S21 | −59.2 | 4.74 | 1.68 | 32 | Eighth lens |
| S22 | −14.72 | 0.2 | | | |
| S23 | −14.46 | 1.2 | 1.74 | 49.8 | Ninth lens |
| S24 | −95.08 | 13 | | | |
| S25 | infinity | −48.37 | | | Plane mirror |
| S26 | 26.49 | −9.61 | 1.49 | 57.4 | Tenth lens |
| S27 | 17.08 | −25.91 | | | |
| S28 | 13.55 | −8.48 | 1.49 | 57.4 | Eleventh lens |
| S29 | 83.77 | −45 | | | |
| S30 | −32.96 | 274.52 | | | Curved reflector |

In Table 5, the distance refers to a linear distance along the optical axis A between two neighboring surfaces. For example, the distance of surface S6 is the linear distance along the optical axis A between surfaces S6 and S7. As for the corresponding thickness, refractive index, and Abbe number of each lens in the Remarks column, refer to the numeral value of each distance, refractive index, and Abbe number in the same row. Moreover, in Table 5, surface S1 is an active surface of the light valve 50, surfaces S4 and S5 are respectively two surfaces of the second glass plane 70, and surfaces S2 and S3 are respectively two surfaces of the first glass plane 60 for protecting the light valve 50, wherein the distance listed in the row of surface S1 is the distance from surface S2 to the active surface of the light valve 50. Surfaces S6 and S7 are two surfaces of the first lens 412, surfaces S8 and S9 are two surfaces of the second lens 414, surfaces S10 and S11 are two surfaces of the third lens 416, surfaces S12 and S13 are two surfaces of the fourth lens 418, surfaces S14 and S15 are two surfaces of the fifth lens 420, surfaces S16 and S17 are two surfaces of the sixth lens 422, surfaces S18 is the aperture stop 460, surfaces S19 and S20 are two surfaces of the seventh lens 432, surfaces S21 and S22 are two surfaces of the eighth lens 434, surfaces S23 and S24 are two surfaces of the ninth lens 436, surfaces S25 is a reflecting surface of the plane mirror 450, surfaces S26 and S27 are two surfaces of the tenth lens 438, surfaces S28 and S29 are two surfaces of the eleventh lens 440, and surfaces S30 is a reflecting surface of the curved reflector M.

As know from Table 5, each of the second lens 414, the third lens 416, and the fifth lens 420 is a lens having low dispersion, wherein Abbe Number of the second lens 414, the third lens 416, and the fifth lens 420 are all greater than 75, and refractive indexes of the second lens 414, the third lens 416, and the fifth lens 420 are all less than 1.55. That is, the second lens group 410 includes at least one low dispersion lens.

In the present embodiment, surfaces S26-S30 of the fixed-focus lens 400 turn 90 degrees in a clockwise manner according to ADE mode, and the AED mode means that the turning angle thereof lies in Y-Z plane and turns with respect to X direction as an axis. That is, due to the plane mirror 450, the light beam is turned about 90 degrees with respect to original traveling direction after being reflected by surface S25, so that an overall length of the fixed-focus lens in the projection system is reduced.

The numeral values of the parameters such as the radius of curvature and the distance of each surface are given in Table 5, and may not be repeated herein again.

The above surfaces S26-S30 are aspheric surfaces with even power, and are expressed by the following formula:

$$Z = \frac{cr^2}{1+\sqrt{1-(1+k)c^2r^2}} + A_2 r^2 + A_4 r^4 + A_6 r^6 + A_8 r^8 + A_{10} r^{10} + A_{12} r^{12}$$

In the formula, Z is a sag in the direction of the optical axis A, and c is the inverse of the radius of an osculating sphere, i.e. the inverse of the radius of curvature (e.g., the radius of curvatures of surfaces S26-S30 in the Table 5) close to the optical axis A. k is a conic coefficient, r is an aspheric height, i.e. the height from the center to the edge of the lens, and $A_2$, $A_4, A_6, A_8, A_{10}, A_{12}$ ... are aspheric coefficients, wherein the coefficient $A_2$ is 0 in the present embodiment. The parameter values of Surfaces S26-S30 are listed in Table 6.

TABLE 6

| Aspheric Parameter | Conic Coefficient k | Coefficient $A_4$ | Coefficient $A_6$ | Coefficient $A_8$ | Coefficient $A_{10}$ | Coefficient $A_{12}$ |
|---|---|---|---|---|---|---|
| S26 | −6.9970294 | −5.76088E−06 | 4.32466E−08 | −7.646E−11 | 9.678E−14 | −4.724E−17 |
| S27 | −2.1011549 | −1.98314E−05 | 4.7319E−08 | −5.478E−11 | 4.7494E−14 | −1.926E−17 |
| S28 | −2.9954781 | 2.23362E−05 | −1.4904E−08 | 4.498E−12 | −8.701E−16 | −6.603E−20 |
| S29 | 0.29846174 | 6.32699E−06 | −3.25838E−09 | 6.6251E−13 | −6.554E−17 | 2.6196E−21 |
| S30 | −4.434686 | 3.18698E−08 | −7.90378E−13 | −2.809E−17 | 2.3837E−21 | −4.876E−26 |

Figure 5:
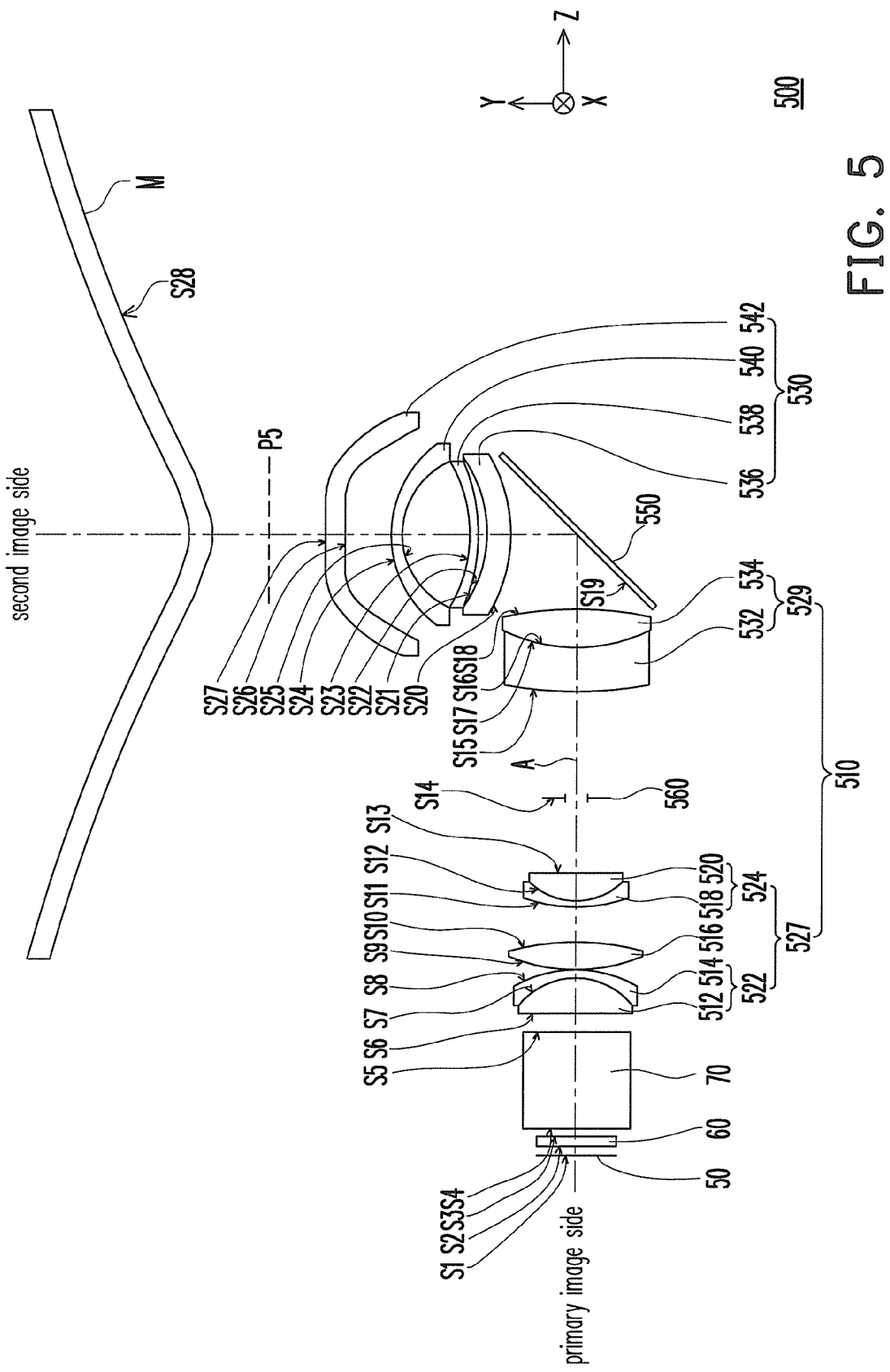
FIG. 5 is a schematic view of a fixed-focus lens according to another embodiment of the invention.

Referring to FIG. 5, the fixed-focus lens 500 of the present embodiment is adapted to be disposed between a primary image side and a second image side. The fixed-focus lens 500 includes a first lens group 530, a second lens group 510, a curved reflector M, and a reflecting element 550. In the present embodiment, the curved reflector M, for example, is a free form reflective mirror disposed in the light path between the primary image side and the second image side, wherein a refractive power of the curved reflector M is negative.

The second lens group 510 is disposed in the light path between the primary image side and the second image side. In the present embodiment, the second lens group 510 includes a first lens 512, a second lens 514, a third lens 516, a fourth lens 518, a fifth lens 520, a sixth lens 532, and a seventh lens 534 arranged in sequence from the primary image side to the second image side. Refractive powers of the first lens 512, the second lens 514, the third lens 516, the fourth lens 518, the fifth lens 520, the sixth lens 532, and the seventh lens 534 are respectively positive, negative, positive, negative, positive, negative, and positive. Each of the first lens 512, the second lens 514, the third lens 516, the fourth lens 518, the fifth lens 520, the sixth lens 532, and the seventh lens 534 is a spherical lens.

Moreover, in the present embodiment, each of the first lens 512 and the third lens 516 is a biconvex lens, the second lens 514 is a convex-concave lens with a convex surface facing the second image side, each of the fourth lens 518 and the sixth lens 532 is a convex-concave lens with a convex surface facing the primary image side, the fifth lens 520 is a concave-convex lens with a convex surface facing the primary image side, and the seventh lens 534 is a biconvex lens, wherein the first lens 512 and the second lens 514 together form a first double cemented lens 522, and the fourth lens 518 and the fifth lens 520 together form a second double cemented lens 524.

The first lens group 530 is disposed in the light path between the second lens group 510 and the second image side. In the present embodiment, the first lens group 530 includes an eighth lens 536, a ninth lens 538, a tenth lens 540, and a eleventh lens 542 arranged in sequence from the primary image side to the second image side, and refractive powers of the eighth lens 536, the ninth lens 538, the tenth lens 540, and the eleventh lens 542 are respectively negative, negative, negative, and negative. Each of the eighth lens 536, the ninth lens 538, and the tenth lens 540 is a spherical lens, and the eleventh lens 542 is an aspheric lens. Moreover, each of the eighth lens 536 and the ninth lens 538 is a convex-concave lens with a convex surface facing the primary image side, and each of the tenth lens 540 and the eleventh lens 542 is a convex-concave lens with a convex surface facing the second image side.

In order to ensure optical image quality, the fixed-focus lens 500 in the present embodiment satisfies at least one of two following conditions:

(i) $8.5 < |F_1/F| < 50.1$
(ii) $20.2 < |F_2/F| < 75.7$ wherein an effective focal length (EFL) of the fixed-focus lens 500 is F, an EFL of the first lens group 530 is $F_1$, and an EFL of the second lens group 510 is $F_2$.

In the present embodiment, for the image light beam passing through the first lens group 530 and the second lens group 510, a distance between a near axial ray focus of the image light beam and the first lens group 530 is shorter than a distance between an off-axis ray focus of the image light beam and the first lens group 530.

Moreover, in the present embodiment, the reflecting element 550, for example, is a plane mirror disposed between the seventh lens 534 and the eighth lens 536 for turning the light path, so that volume of the projection system is reduced. The fixed-focus lens 500 further includes an aperture stop 560 disposed in the light path in the second lens group 510.

Furthermore, in the present embodiment, the first lens 512, the second lens 514, the third lens 516, the fourth lens 518, and the fifth lens 520 are configured as a movable lens group 527. The sixth lens 532 and the seventh lens 534 are configured as a fixed lens group 529. The fixed lens group 529 is fixed with respect to the fixed-focus lens 500. When the fixed-focus lens 500 has manufacture error, the manufacture error is effectively compensated by adjusting a relative position of the movable lens group 527 with respect to the fixed lens group 529 in the second lens group 510, so that the image light beam is focused.

Similarly, in the present embodiment, the offset of the light valve 50 with respect to the optical axis A is greater than or equal to 100%. Accordingly, after passing through the first lens group 530 and the second lens group 510, the image light beam from the light valve 50 forms the trapezoid-like spot on a reference plane P5. The reference plane P5 passes through a center position between the first lens group 530 and the curved reflector M and is perpendicular to the optical axis A. The image light beam forming the trapezoid-like spot is compensated to form another rectangular spot after being reflected by the curved reflector M. Accordingly, the trapezoid-like spot is modified, so that the image without distortion or with less distortion is projected on a screen (not shown). As a result, in the fixed-focus lens 500, the configuration of the curved reflector M with the first lens group 510 and the second lens group 530 is capable of effectively eliminating aberration of optical image. Furthermore, each of the three lenses closest to the primary image side in the fixed-focus lens is a spherical lens, and the refractive powers of the first lens 512 and the third lens 516 are both positive. Accordingly, while less lenses and reflectors are used in the fixed-focus lens 500, the fixed-focus lens 500 still has good optical characteristics. Similarly, when the fixed-focus lens 500 has manufacture error, the manufacture error is effectively compensated by adjusting a relative position of the movable lens group 527 with respect to the fixed lens group 529 in the second lens group 510, so that the image light beam is focused.

An embodiment of the fixed-focus lens 500 is given hereinafter. However, the invention is not limited to the data listed in Table 7 and Table 8. It should be known to those ordinary skilled in the art that various modifications and variations may be made to the structure of the invention without departing from the scope or spirit of the invention.

TABLE 7

| Surface | Curvature radius (mm) | Distance (mm) | Index of refraction | Abbe Number | Notes |
|---|---|---|---|---|---|
| S1 | infinity | 0.48 | | | Active surface of light valve |
| S2 | infinity | 3 | 1.49 | 70.4 | First glass plate |
| S3 | infinity | 2 | | | |
| S4 | infinity | 26 | 1.52 | 64.2 | Second glass plate |
| S5 | infinity | 5.1 | | | |
| S6 | 587.12 | 11.04 | 1.5 | 81.5 | First double cemented lens |
| S7 | −21.19 | 1.98 | 1.79 | 31.3 | |
| S8 | −40.56 | 0.2 | | | |
| S9 | 54.18 | 8.23 | 1.52 | 75.2 | Third lens |
| S10 | −78.97 | 9.81 | | | |
| S11 | 46.33 | 2.02 | 1.79 | 41.7 | Second double cemented lens |
| S12 | 20.25 | 7.75 | 1.5 | 76.1 | |
| S13 | 226.79 | 22.38 | | | |
| S14 | infinity | 31.43 | | | Aperture Stop |
| S15 | 105.68 | 12.83 | 1.85 | 23.8 | Sixth lens |
| S16 | 46.79 | 0.21 | | | |
| S17 | 47.94 | 11.45 | 1.7 | 30.9 | Seventh lens |
| S18 | −88.29 | 22.97 | | | |
| S19 | infinity | −18.99 | | | Plane mirror |
| S20 | −50.69 | −7.43 | 1.74 | 49 | Eighth lens |
| S21 | −40.28 | −2.68 | | | |
| S22 | −62.25 | −2.31 | 1.8 | 40.4 | Ninth lens |
| S23 | −44.74 | −20.1 | | | |
| S24 | 23.64 | −2.81 | 1.81 | 25.4 | Tenth lens |
| S25 | 35.86 | −14.07 | | | |
| S26 | 43.37 | −5.98 | 1.49 | 57.4 | Eleventh lens |
| S27 | 102.95 | −57.06 | | | |
| S28 | −24.31 | 268.55 | | | Curved reflector |

In Table 7, the distance refers to a linear distance along the optical axis A between two neighboring surfaces. For example, the distance of surface S9 is the linear distance along the optical axis A between surface S9 and surface S10. As for the corresponding thickness, refractive index, and Abbe number of each lens in the Remarks column, refer to the numeral value of each distance, refractive index, and Abbe number in the same row. Moreover, in Table 7, surface S1 is an active surface of the light valve 50, surfaces S4 and S5 are respectively two surfaces of the second glass plane 70, and surfaces S2 and S3 are respectively two surfaces of the first glass plane 60 for protecting the light valve 50, wherein the distance listed in the row of surface S1 is the distance from surface S2 to the active surface of the light valve 50. Surfaces S6 and S8 are two surfaces of the first double cemented lens 522, surfaces S9 and S10 are two surfaces of the third lens 516, surfaces S11 and S13 are two surfaces of the second double cemented lens 524, surfaces S14 is the aperture stop 560, surfaces S15 and S16 are two surfaces of the sixth lens 532, surfaces S17 and S18 are two surfaces of the seventh lens 534, surfaces S19 is a reflecting surface of the reflector 550, surfaces S20 and S21 are two surfaces of the eighth lens 536, surfaces S22 and S23 are two surfaces of the ninth lens 538, surfaces S24 and S25 are two surfaces of the tenth lens 540, surfaces S26 and S27 are two surfaces of the eleventh lens 542, and surface S28 is a reflecting surface of the curved reflector M.

As know from Table 7, each of the first lens 512, the third lens 516, and the fifth lens 520 is a lens having low dispersion, wherein Abbe Number of the third lens 516, and the fifth lens 520 are greater than 75, and refractive indexes of the first lens 512, the third lens 516, and the fifth lens 520 are all less than 1.55. That is, the second lens group 510 includes at least one low dispersion lens.

In the present embodiment, surfaces S20-S28 of the fixed-focus lens 500 turn 90 degrees in a clockwise manner according to ADE mode, and the AED mode means that the turning angle thereof lies in Y-Z plane and turns with respect to X direction as an axis. That is, due to the plane mirror 550, the light beam is turned about 90 degrees with respect to original traveling direction after being reflected by surface S19, so that an overall length of the fixed-focus lens in the projection system is reduced.

The numeral values of the parameters such as the radius of curvature and the distance of each surface are given in Table 7, and may not be repeated herein again.

The above surfaces S26 and S27 are aspheric surfaces with even power, and are expressed by the following formula:

$$Z = \frac{cr^2}{1 + \sqrt{1-(1+k)c^2r^2}} + A_1 r^1 + A_2 r^2 + A_3 r^3 + A_4 r^4 + A_5 r^5 + A_6 r^6 + A_7 r^7 + A_8 r^8 + A_9 r^9 + A_{10} r^{10} + \ldots$$

In the formula, Z is a sag in the direction of the optical axis A, and c is the inverse of the radius of an osculating sphere, i.e. the inverse of the radius of curvature (e.g., the radius of curvatures of surfaces S26 and S27 in the Table 7) close to the optical axis A. k is a conic coefficient, r is an aspheric height, i.e. the height from the center to the edge of the lens, and $A_1$-$A_{10}$ are aspheric coefficients. The parameter values of surfaces S26 and S27 are listed in Table 8.

TABLE 8

| Aspheric Parameter | Conic Coefficient k | Coefficient $A_1$ | Coefficient $A_2$ | Coefficient $A_3$ | Coefficient $A_4$ | Coefficient $A_5$ |
|---|---|---|---|---|---|---|
| S26 | −2.66E−01 | 0.02704006 | −0.0170442 | −2.94807E−05 | 3.72534E−05 | 1.49953E−07 |
| S27 | −1.44E+02 | 0.03016227 | −0.010392 | 0.00025303 | 1.88363E−05 | 3.69105E−08 |

| Aspheric Parameter | Coefficient $A_6$ | Coefficient $A_7$ | Coefficient $A_8$ | Coefficient $A_9$ | Coefficient $A_{10}$ |
|---|---|---|---|---|---|
| S26 | −1.23E−08 | 1.09338E−12 | −4.62556E−12 | −3.48362E−14 | 9.13645E−16 |
| S27 | 2.847E−09 | −6.04821E−10 | 1.54435E−11 | −2.00034E−13 | 1.21238E−15 |

Furthermore, the above surface S28 is a freeform surface, and is expressed by the following formula:

$$Z = \frac{c(X^2+Y^2)}{1+\sqrt{1-(1+k)c^2(X^2+Y^2)}} + A_{10}X + A_{01}Y + A_{20}X^2 + A_{11}XY + A_{02}Y^2 + A_{30}X^2 + A_{21}X^2Y + A_{12}XY^2 + A_{03}Y^3 + A_{40}X^4 + A_{31}X^3Y + A_{22}X^2Y^2 + A_{13}XY^3 + A_{04}Y^4$$

In the formula, Z is a sag in the direction of the optical axis A, and c is the inverse of the radius of an osculating sphere, i.e. the inverse of the radius of curvature (e.g., the radius of curvatures of surfaces S28 in the Table 7) close to the optical axis A. k is a conic coefficient, X and Y are respectively values of a coordinate point on a plane perpendicular to the optical axis A, X axis and Y axis are perpendicular to each other, and $A_{10}, A_{20}, A_{01}, A_{11} \ldots$ are freeform coefficients. The parameter values of surface S28 is listed in Table 9.

TABLE 9

| | Conic Coefficient k | Coefficient $A_{10}$ | Coefficient $A_{01}$ | Coefficient $A_{20}$ | Coefficient $A_{11}$ |
|---|---|---|---|---|---|
| S28 | −3.803867834 | 3.21553E−04 | −2.06713E−03 | 9.523204E−04 | −7.85806E−06 |

| Coefficient $A_{02}$ | Coefficient $A_{30}$ | Coefficient $A_{21}$ | Coefficient $A_{12}$ | Coefficient $A_{03}$ |
|---|---|---|---|---|
| 9.926333E−04 | 1.421364E−08 | −4.04457E−07 | 1.786952E−08 | −3.840224E−07 |

| Coefficient $A_{40}$ | Coefficient $A_{31}$ | Coefficient $A_{22}$ | Coefficient $A_{13}$ | Coefficient $A_{04}$ |
|---|---|---|---|---|
| −2.591776E−09 | −4.660119E−11 | −3.48631E−09 | −5.745713E−11 | −1.7361E−09 |

To sum up, the embodiment or the embodiments of the invention may have at least one of the following advantages. The fixed-focus lens of the embodiment of the invention uses the curved reflector with the first lens group and the second lens group to eliminate aberration, so that the fixed-focus lens has wide field of view. Furthermore, the fixed-focus lens uses less reflectors, so that not only is the cost of the products reduced, but also the trouble of aligning the optical axis of the optical system is vanished and the difficulty of fabricating the fixed-focus lens is reduced. Moreover, each of the three lenses closest to the primary image side in the fixed-focus lens is a spherical lens, and the refractive powers of the first lens and the third lens are both positive. Accordingly, while less lenses and reflectors are used in the fixed-focus lens, the fixed-focus lens still has good optical characteristics. Therefore, when the fixed-focus lens is applied in a projection apparatus, the configuration thereof is capable of effectively reducing volume of the projection system and enhancing image quality. Furthermore, the design of the fixed-focus lens in the embodiment of the invention also increases luminous flux of the lens, so that sparks due to light spots on the screen may not become larger, and further, resolution of the image is enhanced. Moreover, by adjusting a relative position of the movable lens group with respect to the fixed lens group in the second lens group, the manufacture error of the fixed-focus lens is effectively compensated, and the image light beam is focused.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A fixed-focus lens, adapted to be disposed between a primary image side and a second image side and having an optical axis, the fixed-focus lens comprising:
   a first lens group disposed between the primary image side and the second image side and comprising an aspheric lens;
   a second lens group disposed in a light path between the primary image side and the first lens group and comprising a first lens, a second lens, and a third lens sequentially arranged from the primary image side to the second image side, wherein refractive powers of the first lens and the third lens are both positive, and each of the first lens, the second lens, and the third lens is a spherical lens; and
   a curved reflector disposed in a light path between the primary image side and the second image side, wherein a refractive power of the curved reflector is negative;
   wherein an image light beam transmitted from the primary image side and passing through the first lens group and the second lens group forms one of a butterfly spot and a trapezoid spot on a reference plane, and the reference plane is located between the first lens group and the curved reflector and perpendicular to a part of the optical axis between the first lens group and the curved reflector; wherein the image light beam forming the butterfly spot is compensated to form a rectangular spot after being reflected by the curved reflector, and the image light beam forming the trapezoid spot is compensated to form another rectangular spot after being reflected by the curved reflector.

2. The fixed-focus lens as claimed in claim 1, wherein the reference plane passes through a center position between the first lens group and the curved reflector.

3. The fixed-focus lens as claimed in claim 1, further comprising a light valve, wherein an offset of the light valve relative to the optical axis is greater than or equal to 100%.

4. The fixed-focus lens as claimed in claim 1, wherein the image light beam is capable of passing through the first lens group and the second lens group, and a distance between a near axial ray focus of the image light beam and the first lens group is shorter than a distance between an off-axis ray focus of the image light beam and the first lens group.

5. The fixed-focus lens as claimed in claim 1, wherein the second lens group comprises a fixed lens group and a movable lens group, wherein the fixed lens group is fixed with respect to the fixed-focus lens, and the movable lens group is capable of moving with respect to the fixed-focus lens to focus.

6. The fixed-focus lens as claimed in claim 1, wherein the second lens group comprises at least one low dispersion lens having Abbe number greater than 75, and a refractive index of the at least one low dispersion lens is less than 1.55.

7. The fixed-focus lens as claimed in claim 1, wherein the second lens group comprises the first lens, the second lens, the third lens, a fourth lens, a fifth lens, a sixth lens, a seventh lens, and an eighth lens arranged in sequence from the primary image side to the second image side, refractive powers of the first lens, the second lens, the third lens, the fourth lens, the fifth lens, the sixth lens, the seventh lens, and the eighth lens are respectively positive, negative, positive, negative, positive, negative, positive, and negative, wherein each of the first lens, the second lens, the third lens, the fourth lens, the fifth lens, the sixth lens, and the seventh lens is a spherical lens, and the eighth lens is an aspheric lens.

8. The fixed-focus lens as claimed in claim 7, wherein each of the first lens, the third lens, the fifth lens, and the seventh lens is a biconvex lens, each of the second lens and the eighth lens is a convex-concave lens with a convex surface facing the second image side, the fourth lens is a convex-concave lens with a convex surface facing the primary image side, and the sixth lens is a biconcave lens, wherein the first lens and the second lens together form a first double cemented lens, and the fifth lens and the sixth lens together form a second double cemented lens.

9. The fixed-focus lens as claimed in claim 1, wherein the first lens group comprises a ninth lens, and a refractive power of the ninth lens is negative, wherein the ninth lens is an aspheric lens.

10. The fixed-focus lens as claimed in claim 1, wherein the second lens group comprises the first lens, the second lens, the third lens, a fourth lens, a fifth lens, a sixth lens, a seventh lens, an eighth lens, a ninth lens, and a tenth lens arranged in sequence from the primary image side to the second image side, refractive powers of the first lens, the second lens, the third lens, the fourth lens, the fifth lens, the sixth lens, the seventh lens, the eighth lens, the ninth lens, and the tenth lens are respectively positive, positive, positive, negative, positive, positive, negative, positive, positive, and negative, wherein each of the first lens, the second lens, the third lens, the fourth lens, the fifth lens, the sixth lens, the seventh lens, the eighth lens, the ninth lens, and the tenth lens is a spherical lens.

11. The fixed-focus lens as claimed in claim 10, wherein each of the first lens and the ninth lens is a concave-convex lens with a convex surface facing the second image side, each of the second lens, the sixth lens, and the eighth lens is a biconvex lens, each of the third lens and the fifth lens is a concave-convex lens with a convex surface facing the primary image side, the fourth lens is a convex-concave lens with a convex surface facing the primary image side, the seventh lens is a biconcave lens, and the tenth lens is a convex-concave lens with a convex surface facing the second image side.

12. The fixed-focus lens as claimed in claim 1, wherein the first lens group comprises a eleventh lens and a twelfth lens arranged in sequence from the primary image side to the second image side, refractive powers of the eleventh lens and the twelfth lens are respectively positive and negative, wherein each of the eleventh lens and the twelfth lens is an aspheric lens.

13. The fixed-focus lens as claimed in claim 1, wherein the second lens group comprises the first lens, the second lens, the third lens, a fourth lens, a fifth lens, a sixth lens, a seventh lens, an eighth lens, and a ninth lens arranged in sequence from the primary image side to the second image side, refractive powers of the first lens, the second lens, the third lens, the fourth lens, the fifth lens, the sixth lens, the seventh lens, the eighth lens, and the ninth lens are respectively positive, positive, positive, negative, positive, negative, positive, positive, and negative, wherein each of the first lens, the second lens, the third lens, the fourth lens, the fifth lens, the sixth lens, the seventh lens, the eighth lens, and the ninth lens is a spherical lens.

14. The fixed-focus lens as claimed in claim 13, wherein each of the first lens, the seventh lens, and the eighth lens is a concave-convex lens with a convex surface facing the second image side, each of the second lens and the fifth lens is a biconvex lens, the third lens is a concave-convex lens with a convex surface facing the primary image side, the fourth lens is a convex-concave lens with a convex surface facing the primary image side, the sixth lens is a biconcave lens, and the ninth lens is a convex-concave lens with a convex surface facing the second image side.

15. The fixed-focus lens as claimed in claim 1, wherein the first lens group comprises a tenth lens and a eleventh lens arranged in sequence from the primary image side to the second image side, refractive powers of the tenth lens and the eleventh lens are respectively positive and negative, wherein each of the tenth lens and the eleventh lens is an aspheric lens.

16. The fixed-focus lens as claimed in claim 1, wherein the second lens group comprises the first lens, the second lens, the third lens, a fourth lens, a fifth lens, a sixth lens, and a seventh lens arranged in sequence from the primary image side to the second image side, refractive powers of the first lens, the second lens, the third lens, the fourth lens, the fifth lens, the sixth lens, and the seventh lens are respectively positive, negative, positive, negative, positive, negative, and positive, wherein each of the first lens, the second lens, the third lens, the fourth lens, the fifth lens, the sixth lens, and the seventh lens is a spherical lens.

17. The fixed-focus lens as claimed in claim 16, wherein each of the first lens and the third lens is a biconvex lens, the second lens is a convex-concave lens with a convex surface facing the second image side, each of the fourth lens and the sixth lens is a convex-concave lens with a convex surface facing the primary image side, the fifth lens is a concave-convex lens with a convex surface facing the primary image side, and the seventh lens is a biconvex lens, wherein the first lens and the second lens together form a first double cemented lens, and the fourth lens and the fifth lens together form a second double cemented lens.

18. The fixed-focus lens as claimed in claim 1, wherein the first lens group comprises an eighth lens, a ninth lens, a tenth lens, and a eleventh lens arranged in sequence from the primary image side to the second image side, refractive powers of the eighth lens, the ninth lens, the tenth lens, and the eleventh lens are respectively negative, negative, negative, and negative, wherein each of the eighth lens, the ninth lens, and the tenth lens is a spherical lens, and the eleventh lens is an aspheric lens.

19. The fixed-focus lens as claimed in claim 1, further comprising an aperture stop disposed in a light path within the second lens group.

20. A fixed-focus lens, adapted to be disposed between a primary image side and a second image side and having an optical axis, wherein a light valve is adapted to be disposed at the primary image side and capable of emitting an image light beam, the fixed-focus lens comprising:
  a first lens group disposed between the primary image side and the second image side and comprising an aspheric lens;
  a second lens group disposed in a light path between the primary image side and the first lens group and comprising a first lens, a second lens, and a third lens sequentially arranged from the primary image side to the second image side, wherein refractive powers of the first lens and the third lens are both positive, and each of the first lens, the second lens, and the third lens is a spherical lens; and
  a curved reflector disposed in a light path between the primary image side and the second image side, wherein a refractive power of the curved reflector is negative;
  wherein the image light beam passing through the first lens group and the second lens group forms one of a first spot and a second spot on a reference plane, and the reference plane is located between the first lens group and the curved reflector and perpendicular to a part of the optical axis between the first lens group and the curved reflector;
  wherein the image light beam forming the first spot is compensated to form a rectangular spot after being reflected by the curved reflector, and the image light beam forming the second spot is compensated to form another rectangular spot after being reflected by the curved reflector;
  wherein the first spot comprises a first butterfly reference point (a), a second butterfly reference point (b), a third butterfly reference point (c), a fourth butterfly reference point (d), a fifth butterfly reference point (e), a sixth butterfly reference point (f), a seventh butterfly reference point (g), an eighth butterfly reference point (h), a ninth butterfly reference point (i), a tenth butterfly reference point (j), a eleventh butterfly reference point (k), a twelfth butterfly reference point (m), and a thirteenth butterfly reference point (n), and a first image point (A), a second image point (B), a third image point (C), a fourth image point (D), a fifth image point (E), a sixth image point (F), a seventh image point (G), an eighth image point (H), a ninth image point (I), a tenth image point (J), a eleventh image point (K), a twelfth image point (M), and a thirteenth image point (N) on the light valve respectively form the butterfly reference points after being imaged by the first lens group and the second lens group, wherein a relationship of the butterfly reference points and the image points satisfies at least one of a first condition and a second condition as follows:

the first condition: $\overline{ac} + \overline{gi} > 2 \times \overline{df}, \overline{ag} > \overline{bh} > \overline{ci}$, $\overline{BE} = 2\overline{BJ}, \overline{CF} = 2\overline{CK}, \overline{bc} \approx \overline{jk}, \overline{EH} = 2\overline{MH}, \overline{FI} = 2\overline{NI}$, and $\overline{mn} \approx \overline{hi}$;

the second condition: $5 > \dfrac{\overline{ac} + \overline{gi}}{2 \times \overline{df}} > 1, 0.1 \leq \dfrac{\overline{bh}}{\overline{ag}} < 1$, $0.1 \leq \dfrac{\overline{ci}}{\overline{bh}} < 1, 0.9 \leq \dfrac{\overline{bc}}{\overline{jk}} < 1.1, 0.9 \leq \dfrac{\overline{hi}}{\overline{mn}} < 1.1, \overline{ef} < \overline{jk}$, and $\overline{ef} < \overline{mn}$;

wherein the second spot comprises a first trapezoid reference point (a'), a second trapezoid reference point (b'), a third trapezoid reference point (c'), a fourth trapezoid reference point (d'), a fifth trapezoid reference point (e'), a sixth trapezoid reference point (f'), a seventh trapezoid reference point (g'), an eighth trapezoid reference point (h'), and a ninth trapezoid reference point (i'), and the first image point (A), the second image point (B), the third image point (C), the fourth image point (D), the fifth image point (E), the sixth image point (F), the seventh image point (G), the eighth image point (H), and the ninth image point (I) on the light valve respectively form the trapezoid reference points after being imaged by the first lens group and the second lens group, wherein a relationship of the trapezoid reference points and the image points satisfies a third condition as follows:

the third condition: $1.05 > \dfrac{\overline{a'c'} + \overline{g'i'}}{2 \times \overline{d'f'}} > 0.95, 0.1 \leq \dfrac{\overline{b'h'}}{\overline{a'g'}} < 1$, and $0.1 \leq \dfrac{\overline{c'i'}}{\overline{b'h'}} < 1$.

21. A fixed-focus lens, adapted to be disposed between a primary image side and a second image side and having an optical axis, the fixed-focus lens comprising:
  a first lens group disposed between the primary image side and the second image side and comprising an aspheric lens;
  a second lens group disposed in a light path between the primary image side and the first lens group and comprising a first lens, a second lens, and a third lens sequentially arranged from the primary image side to the second image side, wherein refractive powers of the first lens and the third lens are both positive, and each of the first lens, the second lens, and the third lens is a spherical lens; and
  a curved reflector disposed in a light path between the primary image side and the second image side, wherein a refractive power of the curved reflector is negative;
  wherein an effective focal length (EFL) of the fixed-focus lens is F, an EFL of the first lens group is $F_1$, and an EFL of the second lens group is $F_2$, and the fixed-focus lens satisfies at least one of following conditions: $8.5 < |F_1/F| < 50.1$ and $20.2 < |F_2/F| < 75.7$.

* * * * *